United States Patent [19]

Suga et al.

[11] Patent Number: 5,497,455
[45] Date of Patent: Mar. 5, 1996

[54] PORTABLE COMPUTER WHICH HAS A TASK SELECTION MENU ALLOWING EASY SELECTION AND EXECUTION OF ARBITRARY APPLICATION SOFTWARE WITHOUT ENTERING A COMMAND

[75] Inventors: Masao Suga; Syuzo Nakajima; Tadaaki Inomata; Toshimitsu Saito; Atsuhiro Outake; Yoshiaki Iba; Hidekazu Mihara; Hirofumi Nishikawa; Nobuyuki Nanno; Shigeru Satake, all of Tokyo, Japan

[73] Assignee: Kabushiki Kaisha Toshiba, Kawasaki, Japan

[21] Appl. No.: 81,408

[22] Filed: Jun. 25, 1993

[30] Foreign Application Priority Data

| Jun. 26, 1992 | [JP] | Japan | 4-169394 |
| Jun. 26, 1992 | [JP] | Japan | 4-169495 |
| Jun. 26, 1992 | [JP] | Japan | 4-169496 |

[51] Int. Cl.⁶ .................... G06F 3/00; G06F 3/14
[52] U.S. Cl. .................... 395/159; 395/155
[58] Field of Search .................... 395/155–161, 395/600, 650, 700; 364/510; 345/117–120

[56] References Cited

U.S. PATENT DOCUMENTS 4,475,176 10/1984 Ishii .
5,270,947 12/1993 Slocum .................... 364/510
5,287,448 2/1994 Nicol et al. .................... 395/159
5,297,286 3/1994 Uehara .................... 395/700

OTHER PUBLICATIONS

Screen Dumps From Microsoft Windows™, 3.1 Microsoft Corporation, 1985–1990, pp. 1–22.
Cowart, Robert, "Mastering Windows™ 3.1 Special Edition", Sybex Inc, 1993, 75–79.
The star User Interface: An Overview, D. C. Smith et al., AFIPS Conference Proceedings, 515–528 (1982).
Lisa Draw, Apple Computer, Inc., pp. A1–A43 (1983).
Toshiba Rupo, Toshiba Corporation, (1992).
Microsoft Windows User's Guide for the Windows Graphical Environment, Version 3.0, Microsoft Corporation, 1985–1990.

*Primary Examiner*—Mark R. Powell
*Assistant Examiner*—U. Chauhan
*Attorney, Agent, or Firm*—Finnegan, Henderson, Farabow, Garrett & Dunner

[57] ABSTRACT

When the MS-DOS is not installed from an FDD or an HDD but is installed from a built-in DOS ROM arranged in a memory space in which bank access to the computer main body can be performed, at the time the system power is turned on, a menu display processing program stored in the DOS ROM is executed by the DOS. Upon execution of the program, the arrangement of menu icons can be arbitrarily changed on the menu screen.

21 Claims, 17 Drawing Sheets

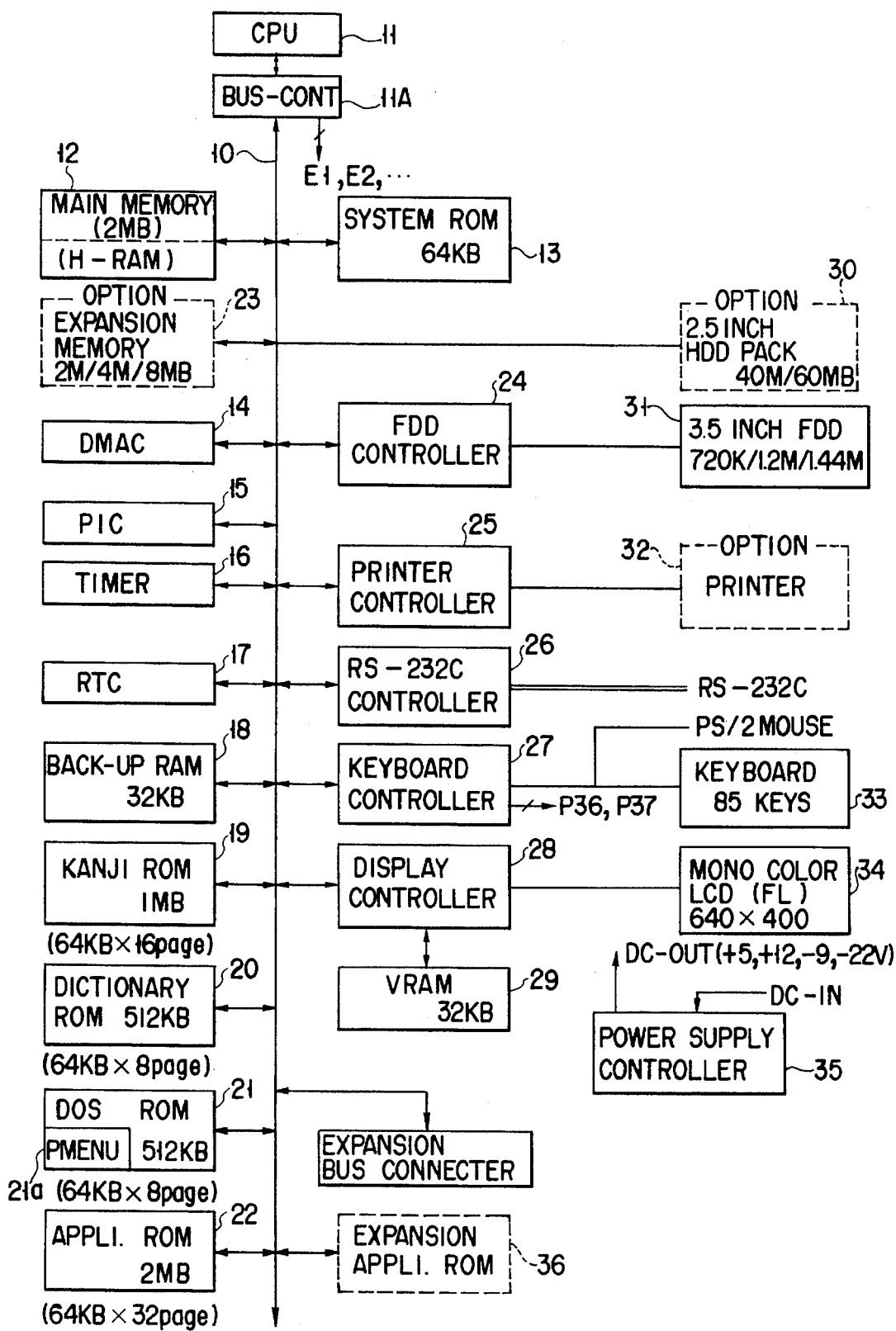
F I G. 1

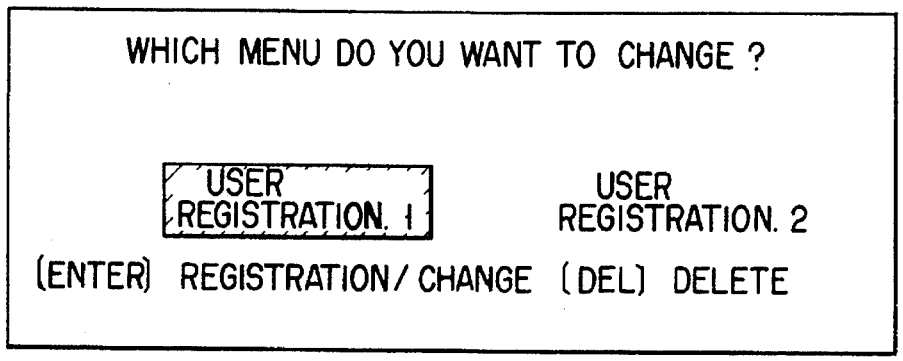
F I G. 10
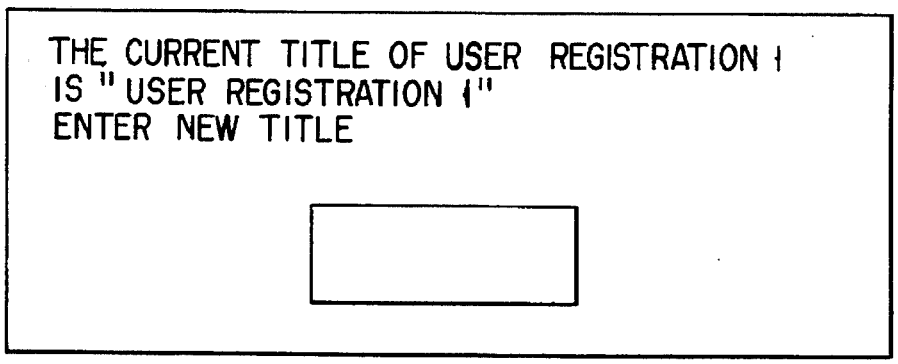
F I G. 11
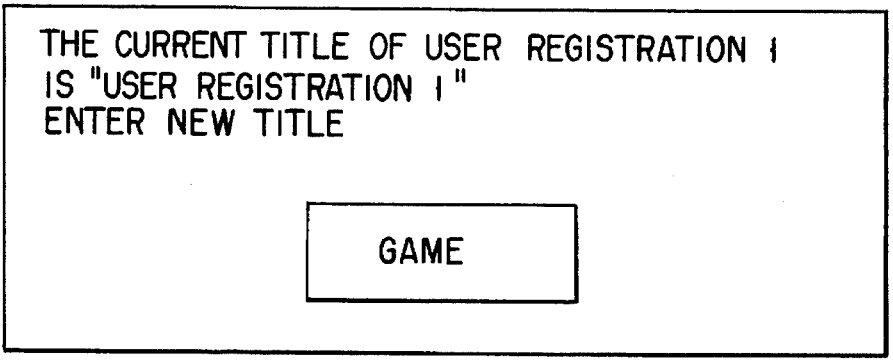
F I G. 12

ENTER FILE NAME TO BE EXECUTED
IN "GAME"

GAME.EXE

F I G. 13

ENTER DESCRIPTION CORRESPONDING TO TITLE "GAME"

COFFEE BREAK. ENJOYABLE GAME //

F I G. 14

INSTALLATION OF SOFTWARE (→ ← ↑ ↓) SELECT     (PREV/NEXT) PAGE CHANGE
       (ENTER) INSTALL              (ESC) COMPLETION

F I G. 15

MENU ICON DISPLAY (SETTING PROCESS)

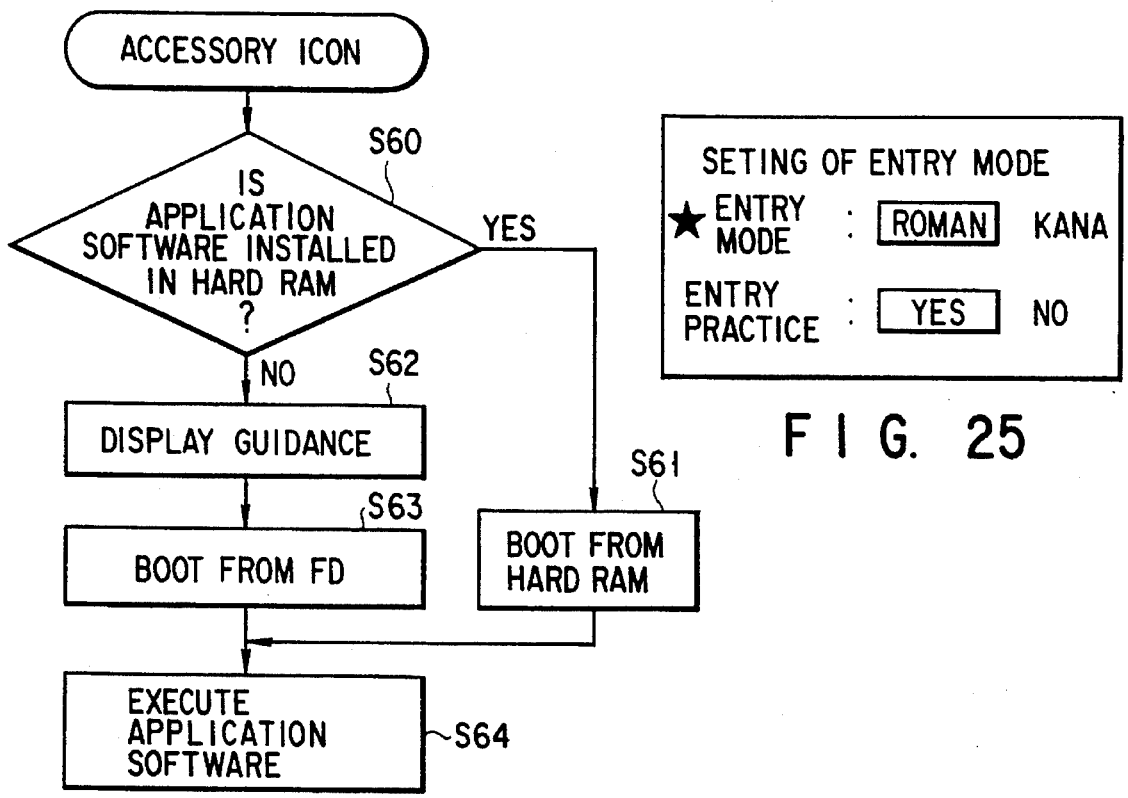
FIG. 24
FIG. 25
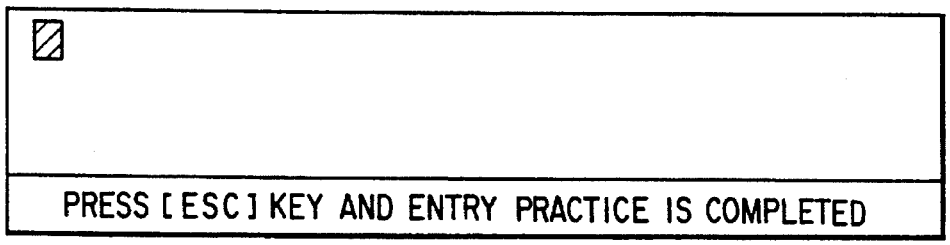
FIG. 26
FIG. 27

PORTABLE COMPUTER WHICH HAS A TASK SELECTION MENU ALLOWING EASY SELECTION AND EXECUTION OF ARBITRARY APPLICATION SOFTWARE WITHOUT ENTERING A COMMAND

BACKGROUND OF THE INVENTION

1. Field of the Invention

The present invention relates a portable computer having a function of displaying a menu screen on which an operation to be executed is selected with an icon.

2. Description of the Related Art

In a conventional portable computer such as a laptop computer or a notebook computer, when tasks based on various types of application software are to be executed, various types of operations are required, e.g., installation of an OS (operating system) as basic software for a system operation from a floppy disk, a hard disk, or the like into the main memory; and entry of execution commands, prior to the execution of the tasks. For this reason, especially for unskilled persons, a problem is posed in terms of operability.

In consideration of operability, some recently developed wordprocessors have a function of displaying a menu screen having a plurality of icons for task selection at the time the power is turned on, thereby allowing the user to arbitrarily select a task on the menu screen.

However, the menu screen of a conventional apparatus of this type is designed such that a plurality of icons to be selected are fixed to preset display positions on the menu screen. In addition, an initial icon selection position is fixed. For this reason, if an icon indicating a task to be executed is not located at the initial icon selection position, a selecting operation including an operation of moving the icon selection position must be performed. More specifically, a cursor indicates an icon at the uppermost left end on the menu screen at the time the power is turned on. If, therefore, target software is registered in an icon at the lowermost right end, the cursor must be moved to the icon to select it. In addition, the arrangement of icons is often unsuitable for personal use, and hence it is not easy to use such a portable computer, posing a problem in terms of operability.

A description of icon rearrangement is given in "Microsoft Windows (TM) User's Guide", Microsoft in the U.S. (published in 1985). The arrangement of the program icons can be adjusted in two ways. In one way, the arrangement icons command on Program Manager's Window menu is selected each time resizing a group window is finished. In the alternative way, the auto arrangement command on Program Manager's Options menu is selected before a group window is resized.

SUMMARY OF THE INVENTION

It is an object of the present invention to provide a portable computer which has a task selection menu allowing easy selection and execution of arbitrary application software without entering a command.

It is another object of the present invention to provide a portable computer which allows arbitrary changes of an icon arrangement, on a menu screen, designed for selection of a plurality of tasks, in accordance with the frequency in use of the respective icons, the order of tasks to be executed, and the like, thereby always displaying a menu screen having a menu icon arrangement ensuring high operability, and a method of displaying menu icons.

It is still another object of the present invention to provide a portable computer which can simultaneously display an icon screen for task selection, and a plurality of function key definition guidance data arranged in correspondence with a plurality of function keys to define the operations thereof.

It is till another object of the present invention to provide a portable computer which has a function of setting an entry mode (system environment) upon operation of a function key, which mode includes a function of displaying an entry practice window on a menu screen when the entry mode is set.

It is still another object of the present invention to provide a portable computer which has a software install program for installing an application program which a user wants to register, which software install program can display installation procedures when the user installs the application program.

It is still another object of the present invention to provide a portable computer which can display an install operation from an external storage device as guidance data when an application program corresponding to a selected icon is not installed from an internal storage device.

According to the first aspect of the present invention, there is provided a portable computer comprising display means for displaying a menu screen having at least one user registration icon for selecting and executing arbitrary software of one piece or plurality of software supplied from a floppy disk and the like and stored in a computer main body (a hard RAM, a hard disk, or the like), means for setting a file name (or file name and attribute data) with respect to the selected user registration icon, means for displaying the selected user registration icon upon changing a display form thereof to a display form indicating that the icon has already been registered (e.g., emphasized display), means for storing display data of the user registration icon, whose display form has been changed to the display form indicating that the icon has already been registered, as part of display data of the menu screen, and means for, when the user registration icon in the display form indicating that the icon has already been registered is selected, starting software having the corresponding file name.

According to the second aspect of the present invention, there is provided a portable computer comprising a ROM for storing a menu screen display processing program started in initialization processing when system power is turned on, and menu components including a plurality of menu icons used to access the program, a nonvolatile memory portion, constituted by, e.g., a hard RAM or a hard disk in a computer main body, for storing menu display management data including display position and selection position data of the menu icons, processing means based on the program for displaying the plurality of menu icons (shown in, e.g., FIG. 4) on a display screen in accordance with data in the memory portion, operation entry means (e.g., operation entry means using function keys and display selectors) for designating a rearrangement setting mode for changing the positions of the respective icons displayed by the processing means, processing means based on the program for updating the data in the memory portion in accordance with data set in the rearrangement setting mode, and re-displaying a menu screen having menu icons having menu icons based on the updated data on the display screen, processing means based on the program for emphatically displaying a menu icon, on the menu screen, which corresponds to a previously executed task, as an icon in an initial selection state in accordance with the selection position data of the menu icons, and operation entry means for selecting an arbitrary menu icon on the menu screen, wherein a task corresponding to a menu icon selected on the menu screen is instantaneously executed.

According to the third aspect of the present invention, there is provided a method of selecting a function with an illustration as an icon, comprising the computer steps of: a) displaying a first menu screen having, as menu components, a plurality of icons for selecting tasks to be executed, and a plurality of function selector display guides including an icon rearrangement function selector when system power is turned on; b) displaying a second menu screen for opening an icon display window for deleting each icon on the first menu screen and displaying target icons to be rearranged one by one and an arrangement number entry window for designating an arrangement position of an icon displayed on the icon display window, and for allowing updating of display contents of the icon display window, and setting of an arrangement number in the arrangement number entry window when the menu icon rearrangement function selector is selected while the first menu screen is displayed; and c) displaying a third menu screen for arranging an icon displayed on the icon display window at an icon display position corresponding to the set arrangement number, and displaying a changed registered stated of the icon when an arrangement number is set in the arrangement number entry window on the second menu screen, wherein a menu screen having icons rearranged by the second and third menu screens becomes a first menu screen when the system power is turned on next.

According to the fourth aspect of the present invention, there is provided a portable computer comprising means for simultaneously displaying a task selection icon screen including an icon for selecting at least one application program, and a plurality of function key definition guidance data arranged in correspondence with a plurality of function keys to define operations of the function keys, means for selecting one of the icons on the menu screen by using cursor keys, and means for selecting the function key definition guidance data on the menu screen by using a corresponding one of the function keys, wherein the function keys have functions of setting a system environment.

According to the fifth aspect of the present invention, there is provided a portable computer comprising means for simultaneously displaying a task selection icon screen including an icon for selecting at least one application program, and a plurality of function key definition guidance data arranged in correspondence with a plurality of function keys to define operations of the function keys, means for selecting one of the icons on the menu screen by using cursor keys, and means for selecting the function key definition guidance data on the menu screen by using a corresponding one of the function keys, and a function, set in one of the function keys, for setting a system environment for an entry mode, wherein the function of setting a system environment for an entry mode includes a function of setting and displaying an entry practice window on the menu screen.

According to the sixth aspect of the present invention, there is provided a portable computer comprising means for displaying a plurality of icons including an icon for selecting at least one existing application program, and an icon for software installation, an internal storage device for storing the existing application program and a software install program for installing an application program which a user wants to register, and means for selecting one of the icons by using cursor keys, wherein the software install program has a function of displaying installation procedures on a screen when the user installs an application program.

According to the seventh aspect of the present invention, there is provided a portable computer comprising means for displaying a plurality of icons including an icon for selecting at least one application program, an internal storage device for storing the application program, means for selecting one of the icons by using cursor keys, and means for displaying an install operation from an external storage device as guidance data when the application program corresponding to the selected icon is not installed in the internal storage device.

In the above-described arrangement, one user registration icon is selected on the menu screen by operating cursor keys, and the file name (or the file name and attribute data) of software stored in the computer main body is set in the selected user registration icon. The set contents are then reflected in the selected user registration icon so that the user registration icon is displayed in a display form, e.g., emphasized-display, indicating that the icon has already been registered.

By selecting this emphatically displayed user registration icon, a command corresponding to the icon is issued, and software having the corresponding file name is executed.

By registering arbitrary software in a user registration icon in this manner, arbitrary software can be easily executed on the menu screen.

According to the present invention, an icon screen for task selection, which includes an icon for selecting at least one application program, and a plurality of function key definition guidance data arranged in correspondence with a plurality of function keys to define the operations thereof can be simultaneously displayed on the menu screen. With this operation, a selecting operation using an icon and an operation of a function key can be performed on the same screen.

In addition, according to the present invention, the function of setting a system environment of each entry mode is set in one of the function keys. With the function of this entry mode, the entry practice window can be set on the menu screen, and keyboard entry practice can be performed in this window.

Furthermore, according to the present invention, the portable computer includes a software install program for installing an application program which the user wants to register. With this software install program, installation procedures can be displayed when the user installs the application program.

Moreover, according to the present invention, if an application program corresponding to a selected icon is not installed in the internal storage device, installation procedure data from an external storage device can be displayed as guidance data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing the system configuration of a portable computer according to the first embodiment of the present invention;

FIG. 10 is a view showing a user registration screen in the first embodiment;

FIG. 11 is a view showing a user registration screen in the first embodiment;

FIG. 12 is a view showing a user registration screen in the first embodiment;

FIG. 13 is a view showing a user registration screen in the first embodiment;

FIG. 14 is a view showing a user registration screen in the first embodiment;

FIG. 15 is a view showing a software install screen in the first embodiment;

FIG. 24 is a flow chart showing a sequence of checking whether application software is installed in an H-RAM;

FIG. 25 is a view showing screen displaying selection of an entry mode;

FIG. 26 is a view showing screen displaying entry practice according to an input mode; and FIG. 27 is a view showing a screen for displaying guidance data in a case wherein no application software is installed in the H-RAM.

DETAILED DESCRIPTION OF THE PREFERRED EMBODIMENTS

Figure 2:
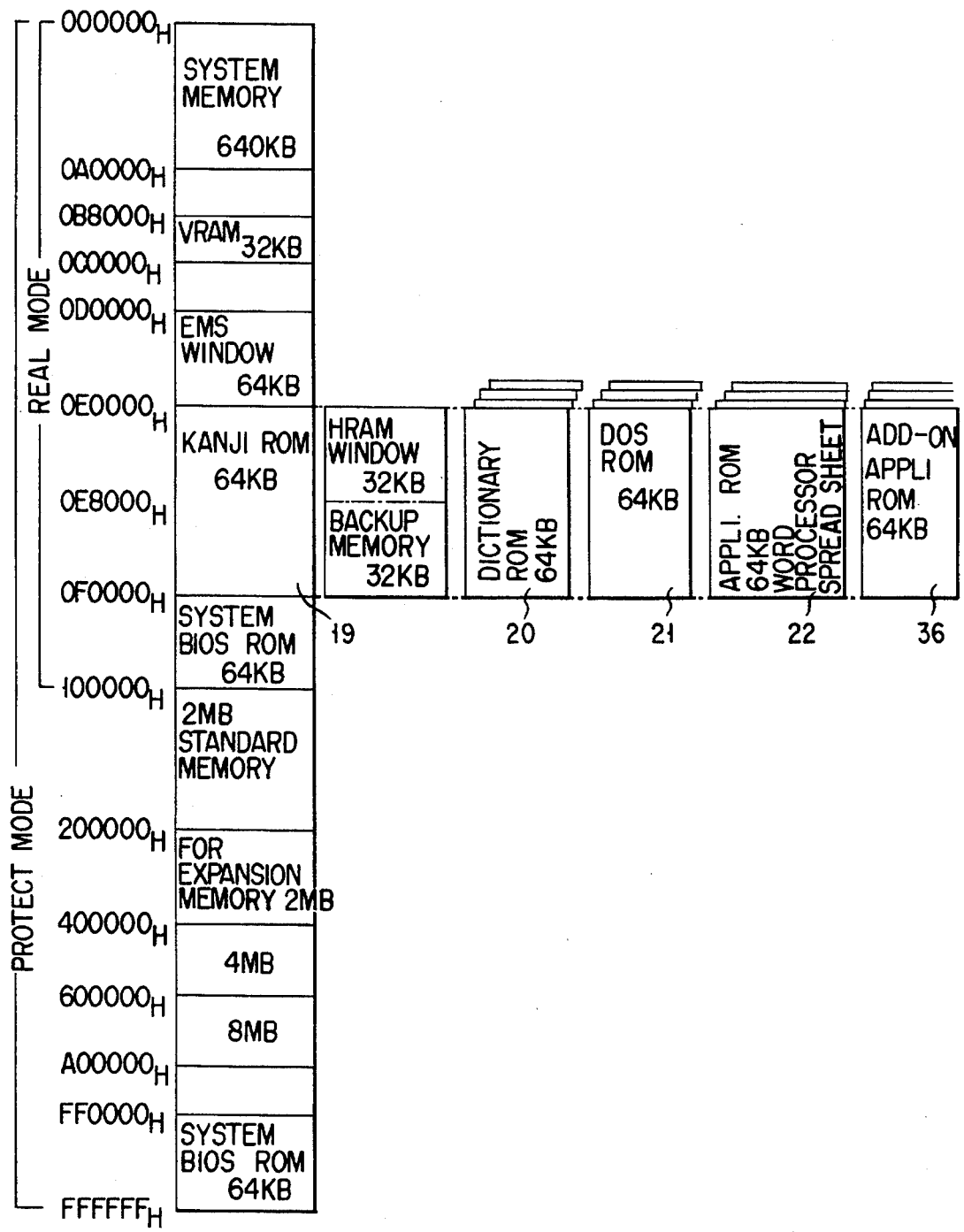
FIG. 2 is a view showing the memory map of the portable computer according to the first embodiment.

An embodiment of the present invention will be described below with reference to the accompanying drawings. This embodiment exemplifies the portable computer having two user registration icons on a menu screen, which icons are used to select the execution of software arbitrarily stored in the computer main body by the user.

FIG. 1 is a block diagram showing the system configuration of the portable computer according to the embodiment.

Referring to FIG. 1, reference numeral 11 denotes a CPU for controlling the overall system. When basic software for the system operation, e.g., the MS-DOS (registered trademark), stored in a ROM (DOS ROM 21) in the computer is installed, the CPU 11 starts a menu display processing program (P MENU) 21a stored in the DOS ROM 21 in initialization processing, and executes processing routines associated with menu display, such as the ones shown in the flow charts in FIGS. 5 through 8, and FIGS. 17 through 24. More specifically, when the system power is turned on, and the MS-DOS is installed from the built-in DOS ROM 21 located in a memory space in which the banks of the computer main body can be accessed, instead of installing the MS-DOS from a floppy disk drive (FDD) 31 or a hard disk (HDD (option)) 30, the menu display processing program (P MENU) 21a stored in the DOS ROM 21 is executed by the DOS, thus executing processing routines, associated with menu display, including setting of user registration icons and execution of icon display, such as the ones shown in FIGS. 5 through 9 and FIGS. 17 through 24.

Figure 3:
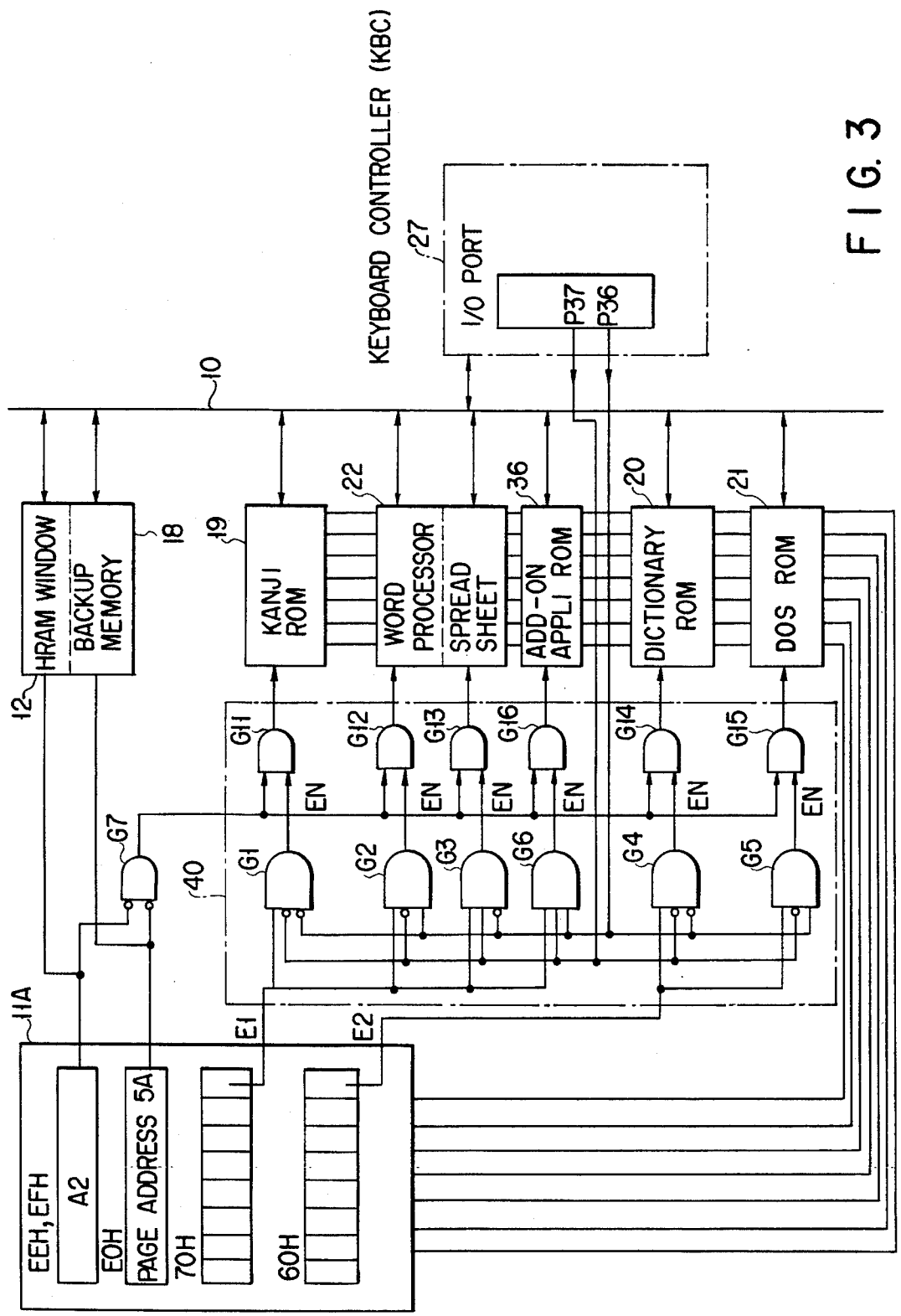
FIG. 3 is a circuit diagram showing a hardware arrangement for inter-ROM bank switching in the first embodiment.

Reference numeral 11A denotes a bus controller for performing bus access control, bus cycle control, and the like of various system components such as I/O units. In this case, as shown in FIG. 3, enable signals E1 and E2 output from the bus controller 11A are used for bank switching between the kanji ROM 19, the dictionary ROM 20, the DOS ROM 21, the application ROM 22, and the expansion application ROM 36.

Reference numerals 12 through 29 denote system components connected to the CPU 11 through a system bus 10 and the bus controller 11A.

More specifically, the system component 12 is a main memory used as a storage area for an executable program (to be executed), a work area, and the like. In this case, the main memory 12 has a capacity of 2 MB. Part of the area of the main memory 12 except for the system program area (640 KB) shown in FIG. 2 can be set as a hard RAM (H-RAM). For example, this hard RAM (H-RAM) can be used as an area for storing commercially available application software loaded from the floppy disk drive 31. In this case, if a user registration icon is set with respect to the software, the software corresponding to the registered icon can be executed by only selecting the user registration icon (a4 or a5) in a registered state indicated by, e.g., emphasized display, on the menu screen shown in FIG. 4 by performing a cursor key operation.

In the embodiment of the present invention, the above-mentioned hard RAM is set instead of mounting the hard disk (HDD pack) 30. The following description is based on the assumption that a file containing menu display management data including the display location data of menu icons is set in the hard RAM.

The system component 13 is a system ROM for storing control programs including an IRT processing routine. In this case, the control programs include a processing routine for automatically installing the DOS ROM 21 incorporated, as a standard unit, in the computer, when it is confirmed that the MS-DOS is not supplied from the floppy disk drive 31, the hard disk (HDD) 30, or the like, in initialization processing to start the system. Note that the DOS ROM 21 stores the menu display processing program (P MENU) 21a having the processing functions shown in FIGS. 5 through 9, and FIGS. 17 through 24. The DOS stored in the DOS ROM 21 treats the menu display processing program (P MENU) 21a as one execution file.

The system component 14 is a DMA controller (DMAC: Direct Memory Access Controller) for performing direct data transfer by directly performing access control with respect to the main memory 12; 15, a programmable interrupt controller (PIC) 15 for controlling interruption in accordance with a set program; 16, a timer (Programmable Interval Timer) for executing a timer count operation in accordance with a set program; 17, a real-time clock (RTC) as a timepiece module having a CMOS memory for storing data and used, for example, to store setup data; and 18, a backup RAM backed up by a battery and used, for example, to store system configuration data set by the user.

The system component 19 is a kanji ROM for storing various kanji fonts; and 20, a dictionary ROM used as a kana/kanji conversion table. The kanji ROM 19 and the dictionary ROM 20 are mapped in the same 64-Kbyte address space together with the DOS ROM 21 and the application ROM 22 (both will be described later), as shown in FIG. 2, and are selectively read-accessed by bank switching, as shown in FIG. 3.

The system component 21 is a DOS ROM for storing the MS-DOS as basic software for the system operation of this computer system, and the menu display processing program (P MENU) 21a driven by the DOS and having the processing functions shown in FIGS. 5 through 9 and FIGS. 17 through 24. In this case, the DOS ROM 21 consists of 512 Kbytes (64 Kbytes×8 pages). As shown in FIG. 2, the DOS ROM 21 is mapped in the same memory space, in which bank access can be performed, together with the kanji ROM 19, the dictionary ROM 20, the application ROM 22, and the expansion application ROM 36. The DOS ROM 21 is selectively accessed by the bank switching circuit shown in FIG. 3.

Figure 4:
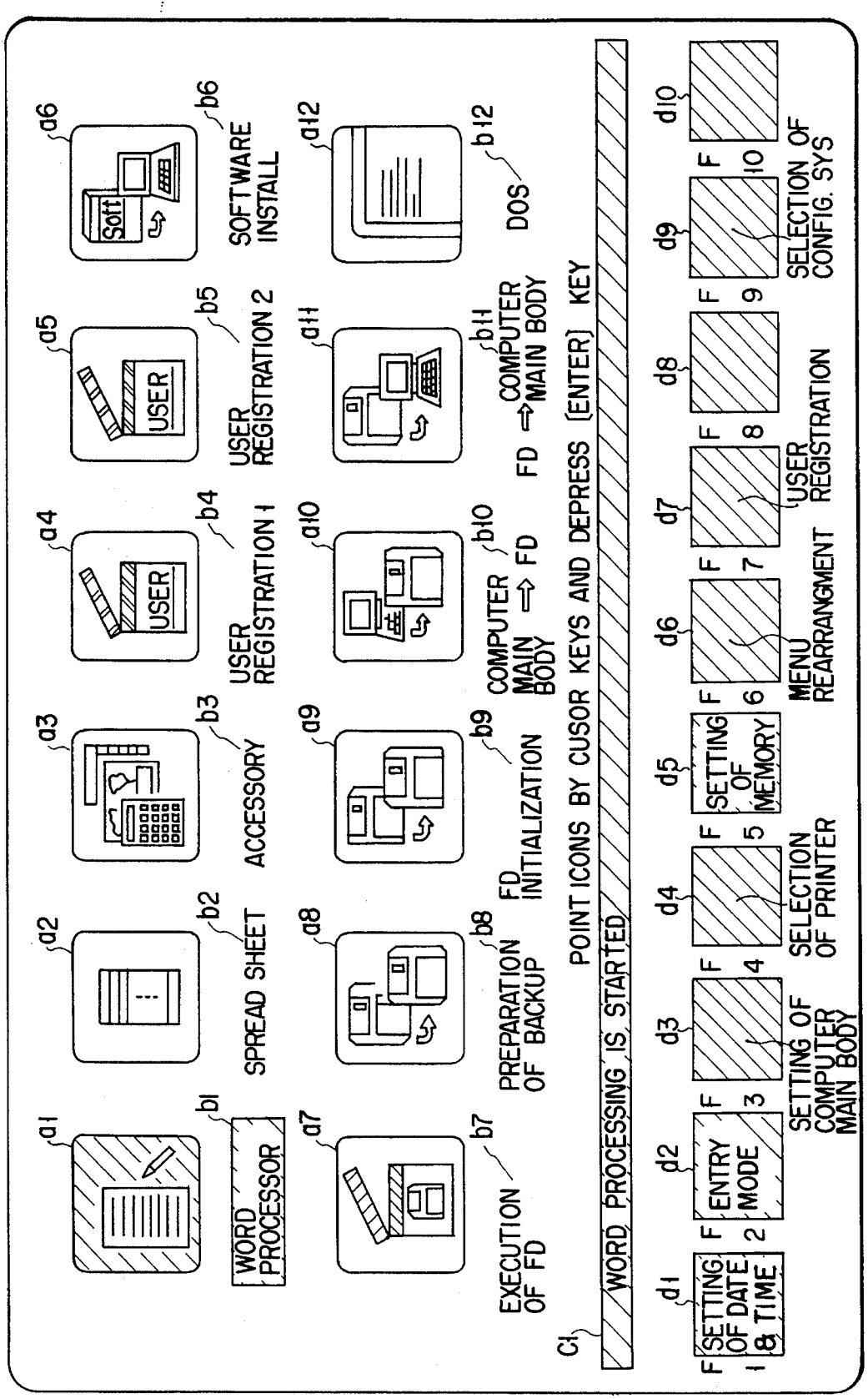
FIG. 4 is a view showing the arrangement of an initial menu screen in the first embodiment.

With the DOS ROM 21, the system can be automatically started without installing the MS-DOS from the floppy disk drive (FDD) 31, the hard disk (HDD pack) 30, or the like upon turning on the system power. In this case, a menu for task selection, such as the one shown in FIG. 4, is automatically displayed when the menu display processing program (P MENU) 21a is started. On this menu, the user selects and executes application programs stored in the application ROM 22, software registered in user registration icons (a1, a2), and the like.

The system component 22 is an application ROM for storing application software. In this case, Japanese word processor application software and spreadsheet application software are stored in the application ROM 22.

Similar to the above-described DOS ROM 21, the application ROM 22 is mapped in the same memory space, in which bank access can be performed, together with the kanji ROM 19, the dictionary ROM 20, and the like, and is selectively accessed by the bank switching circuit. According to the system of this embodiment, therefore, when the system power is turned on, and "WORD PROCESSOR" or "SPREADSHEET" is selected from the displayed menu for task selection, the selected task can be immediately executed without installing the MS-DOS, application software, and the like from the floppy disk drive 31, the hard disk (HDD pack) 30, or the like.

The system component 23 is an option expansion memory connected to the computer to expand the memory area as needed.

Of the above-described ROMs, the kanji ROM 19, the dictionary ROM 20, the DOS ROM 21, and the application ROM 22 are constituted by mask ROMs, respectively, but the expansion memory 23 is constituted by a one-time PROM (OTP).

The system component 24 is an FDD controller for controlling the floppy disk drive (FDD) 31 for driving a 3.5-inch floppy disk (FD); 25, a printer controller for controlling a printer 32 connected optionally; and 26, an RS-232C controller for controlling the RS-232C connected optionally.

The system component 27 is a keyboard controller for controlling a keyboard 33, a mouse, and the like. 2-bit signals (P36 and P37) output from I/O ports of the keyboard controller 27 are used for bank switching between the kanji ROM 19, the dictionary ROM 20, the DOS ROM 21, the application ROM 22, and the expansion application ROM 36.

The system component 28 is a display controller for performing read/write control with respect to a video RAM (VRAM) 29, and drives/controls a liquid crystal display 34 having a resolution of 640×400 dots.

Reference numeral 35 denotes a power supply controller having a special microprocessor for ON/OFF-controlling the system power. The power supply controller 35 generates various kinds of power including backup power required for the system by using power from an AC adaptor, a built-in battery, and the like, and controls charging of the built-in battery.

FIG. 2 shows the memory map of the portable computer in the above-described embodiment.

As shown in FIG. 2, the kanji ROM 19, the dictionary ROM 20, the DOS ROM 21, the application ROM 22, the expansion application ROM 36, a hard RAM window, and the like are commonly allocated to a 64-Kbyte area from address "0E0000H" through address "0F0000H".

For this reason, exclusive control is required for access to the kanji ROM 19, the dictionary ROM 20, the DOS ROM 21, the application ROM 22, the expansion application ROM 36, the hard RAM, and the like.

This exclusive control can be realized by an inter-ROM bank switching method in which hardware control is performed to set one ROM in an enable state while setting the remaining ROMs in a disabled state.

This inter-ROM bank switching method is performed by hardware using the signals (E1 and E2) output from the bus controller 11A and the signals (P36 and P37) output from the I/O ports of the keyboard controller 27. The detailed arrangement of this hardware will be described later with reference to FIG. 3.

Bank switching in a ROM selected by the inter-ROM bank switching method is executed in units of pages.

Assume that the 1-MB kanji ROM 19 is selected. In this case, 16 pages (each consisting of 64 KB (Kbytes)) constituting the kanji ROM 19 are bank-switched in units of pages so that the 1-MB area is selectively referred to in units of pages. If the 512-KB dictionary ROM 20 is selected, 8 pages (each consisting of 64 KB) constituting the dictionary ROM 20 are bank-switched in units of pages. As a result, the 512-KB area is selectively referred to in units of pages. Similarly, if the 512-KB DOS ROM 21 is selected, 8 pages (each consisting of 64 KB) constituting the DOS ROM 21 are bank-switched in units of pages, and the 512-KB area is selectively referred to in units of pages. If the application ROM 22 is selected, 32 pages (each consisting of 64 KB) constituting the application ROM 22 are bank-switched in units of pages, and the 2-MB area is selectively referred to in units of pages. If the expansion application ROM 36 is selected, 32 pages (each consisting of 64 KB) constituting the expansion application ROM 36 are bank-switched in units of pages, and the 2-MB area is selectively referred to.

FIG. 3 shows the hardware arrangement for performing the above-described inter-ROM bank switching method.

Referring to FIG. 3, a gate circuit 40 performs bank switching of each of the following ROMs: the kanji ROM 19, the dictionary ROM 20, the DOS ROM 21, the application ROM 22, and the expansion application ROM 36. The gate circuit 40 selects one of the abovementioned ROMs (19, 20, 21, 22, and 36) in accordance with the enable signals E1 and E2 output from the bus controller 11A and the I/O port signals P37 and P36 output from the keyboard controller 27.

In this case, the enable signal E1 is a predetermined 1-bit output from an I/O register arranged in the bus controller 11A at address 70H, and the enable signal E2 is a predetermined 1-bit output from an I/O register arranged in the bus controller 11A at address 60H. The bit values of these I/O registers are set by the CPU 11.

The enable signal E1 indicates selection/non-selection of a first ROM group constituted by the kanji ROM 19, the application ROM 22, and the expansion application ROM 36. When the enable signal E1 is set at "1", the first ROM group is selected. When the enable signal E1 is set at "0", the first ROM group is set in a non-selected state.

The enable signal E2 indicates selection/non-selection of a second ROM group constituted by the dictionary ROM 20 and the DOS ROM 21. When the enable signal E2 is set at "1", the second ROM group is selected. When the enable signal E2 is set at "0", the second ROM group is set in a non-selected state.

The I/O port signals P37 and P36 are output from I/O ports with port numbers P37 and P36 arranged in the keyboard controller 27. The output values from the I/O ports with port numbers P37 and P36 are set by the CPU 11. The I/O port signals P37 and P36 are used to determine which ROM of a selected ROM group is to be set in an enabled state.

As shown in FIG. 3, the gate circuit 40 is constituted by six 3-input AND gates G1 through G6 and six 2-input AND gates G11 through G16. The AND gate G1 receives the enable signal E1, the inverted signal of the I/O port signal P37, and the inverted signal of the I/O port signal P36. An output from the AND gate G1 is supplied, as an enable signal EN, to one input terminal of the AND gate G11. An output from the AND gate G7 is supplied to the other input terminal of the AND gate G11. When the HRAM window 12 or the backup RAM 18 is selected, the AND gate G7 supplies a logic-"0" signal to the AND gate G11 and the AND gates G12 through G16 (to be described later), thereby disabling the AND gates G11 through G16. When a logic-"1" signal is supplied from the AND gate G7 to the AND gate G11, i.e., when neither the HRAM window 12 nor the backup RAM 18 is selected, the AND gate G11 supplies the output from the AND gate G1, as an enable signal, to the kanji ROM 19.

The AND gate G2 receives the enable signal E1, the inverted signal of the I/O port signal P37, and the I/O port signal P36. An output from the AND gate G2 is supplied, to the AND gate G12, as the enable signal EN for a ROM block, in the application ROM 22, in which the word processor application program is stored. Upon reception of a logic-"1" signal from the AND gate G7, the AND gate G12 supplies the output from the AND gate G2, as the enable signal EN, to the application ROM 22.

The AND gate G3 receives the enable signal E1, the I/O port signal P37, and the inverted signal of the I/O port signal P36. An output from the AND gate G3 is supplied, to the AND gate G13, as the enable signal EN for a ROM block, in the application ROM 22, in which the spreadsheet application program is stored. Upon reception of a logic-"1" signal from the AND gate G7, the AND gate G13 supplies the output from the AND gate G3, as the enable signal EN, to the application ROM 22.

The AND gate G4 receives the enable signal E2, the inverted signal of the I/O port signal P37, and the inverted signal of the I/O port signal P36. An output from the AND gate G4 is supplied, as the enable signal EN, to the dictionary ROM 20.

The AND gate G5 receives the enable signal E2, the inverted signal of the I/O port signal P37, and the I/O port signal P36. An output from the AND gate G5 is supplied, as the enable signal EN, to the AND gate G14. Upon reception of a logic-"1" signal from the AND gate G7, the AND gate G14 supplies the output from the AND gate G4, as the enable signal EN, to the DOS ROM 21.

The AND gate G6 receives the enable signal E1, the I/O port signal P37, and the I/O port signal P36. An output from the AND gate G6 is supplied, to the AND gate G16, as the enable signal EN for a ROM block, in the expansion application ROM 36, in which an application program registered by the user is stored. Upon reception of a logic-"1" signal from the AND gate G7, the AND gate G16 supplies the output from the AND gate G6, as the enable signal EN, to the expansion application ROM 36.

In order to select the HRAM window 12, index A2H is I/O-written at I/O port address EEH, and bit 7 of I/O port address EFH is set at "1". In order to designate a specific page of the HRAM window 12, index A1H is I/O-written at I/O port address EEH, and a page to be read (one of 256 pages) is designated at I/O port address EFH. Similarly, in order to select the backup RAM 18, index 5AH is I/O-written at I/O port address EOH.

FIG. 4 shows the detailed arrangement of a menu screen displayed on the liquid crystal display 34 when the system is started by the DOS in the DOS ROM 21.

For the sake of descriptive convenience, this embodiment exemplifies the portable computer having two user registration icons on the menu screen, which icons are used to select the execution of software arbitrarily stored in the computer main body by the user. However, the portable computer may have three or more user registration icons, or only one user registration icon, for example.

Referring to FIG. 4, reference symbols a1 through a12 denote menu icons for task selection. More specifically, the menu icon a1 is a word processor icon for starting an existing word processor application program of the application software incorporated in the system; a2, a spreadsheet icon for starting an existing spreadsheet application program of the application software incorporated in the system; and a3, an accessory icon a3 for starting accessories such as a calendar, a calculator, a world timepiece, and the like.

The menu icons a4 and a5 are user registration icons for registering arbitrary software programs such as commercially available software in a menu and starting them.

There are two methods of performing software registration in the user registration icons a4 and a5. In the first registration method, the function key F7 is operated on the menu shown in FIG. 4 to access the user registration function in the menu display processing program (P MENU) 21a, and an icon (a4 or a5) in which icon registration is to be performed is selected. The user then sets and registers arbitrary registration data. In the second registration method, the software install icon a6 is selected on the menu screen, and the software install program in the menu display processing program (P MENU) 21a is started. Registration data of the program is then automatically registered in a non-registered icon.

Figure 7:
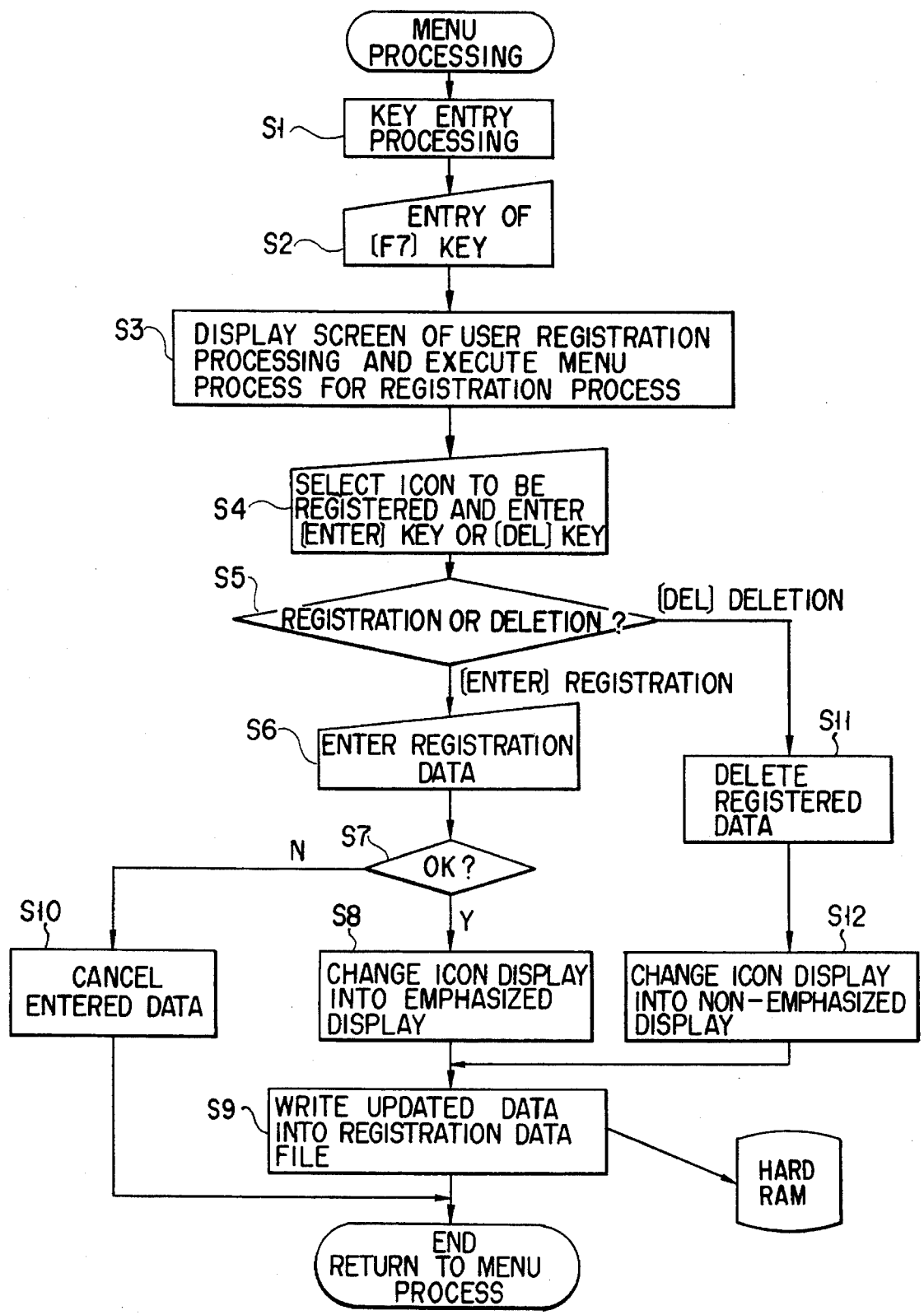
FIG. 7 is a flow chart showing a sequence of performing user registration when "USER REGISTRATION" is selected by operating a function key F7 on the menu screen shown in FIG. 4.
Figure 8:
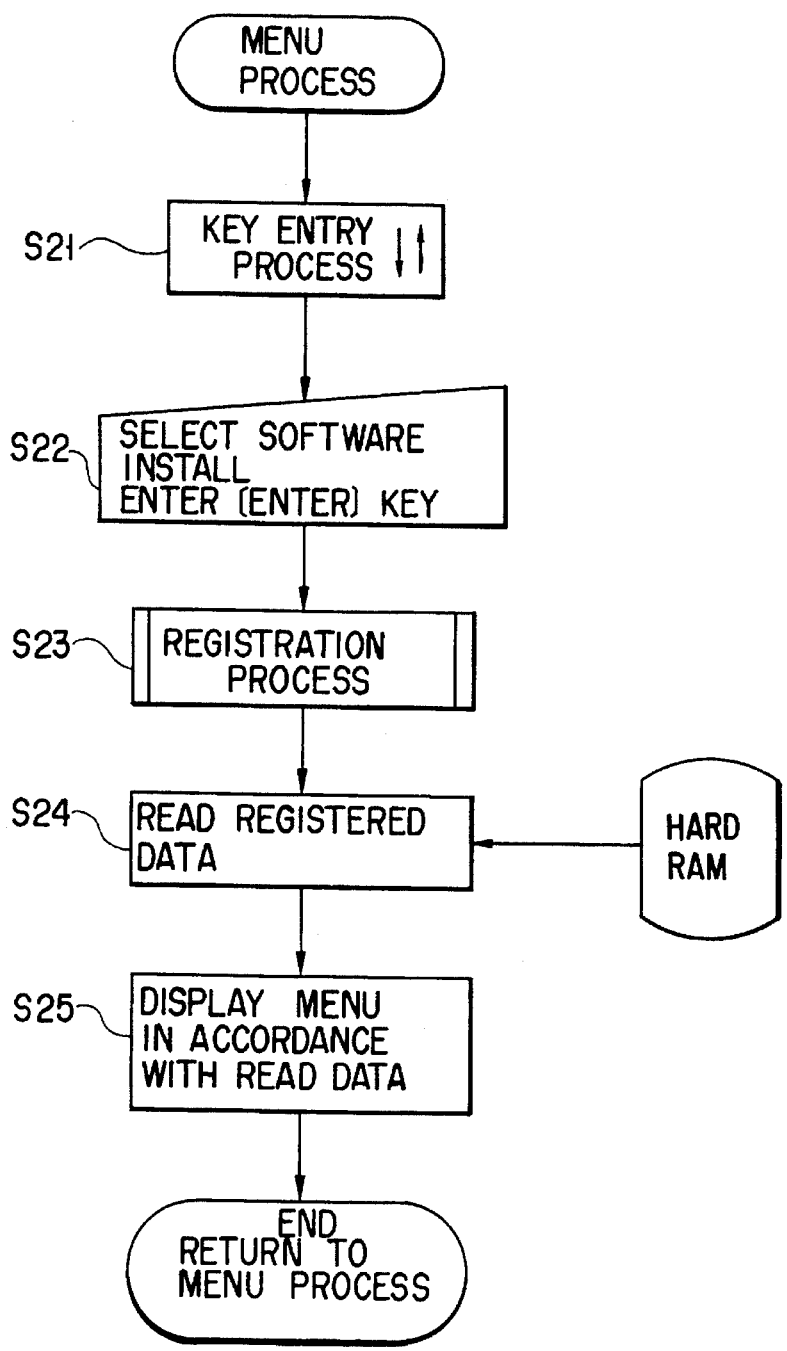
FIG. 8 is a flow chart showing a sequence of performing software install processing when a software install icon a6 is selected on the menu screen shown in FIG. 4.
Figure 9:
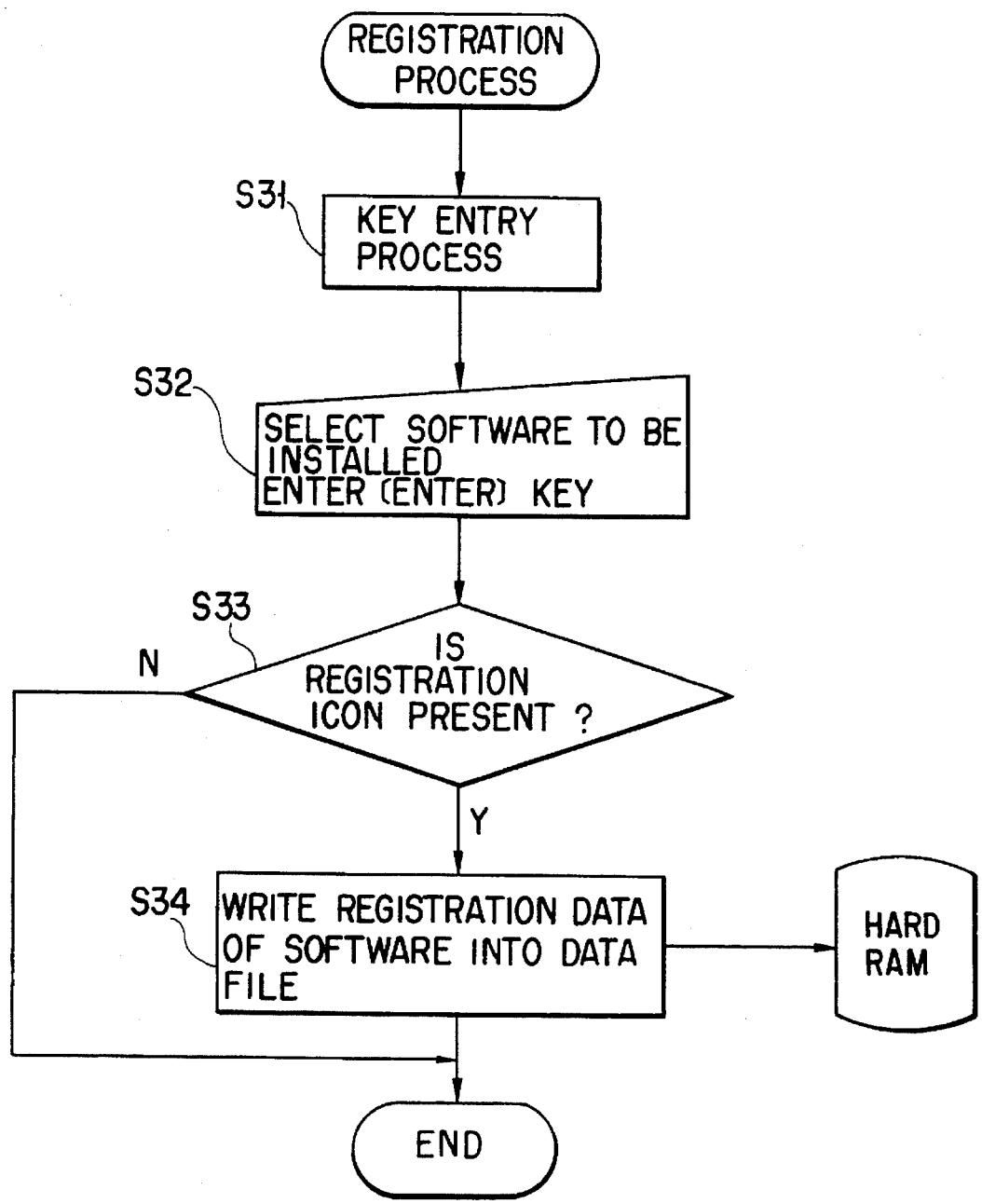
FIG. 9 is a flow chart showing a sequence of performing user registration processing in step S23 in FIG. 8.

FIG. 7 shows a sequence of the first registration method. FIGS. 8 and 9 show a sequence of the second registration method. These sequences will be described in detail later.

The menu icon a6 is a software install icon for starting registration (copying) of arbitrary software such as commercially available software into the computer main body (the hard RAM (H-RAM) or the hard disk (HDD pack) 30).

The menu icon a7 is an FD execution icon a7 for starting commercially available software supplied from a floppy disk (FD) (i.e., starting "autoexec.bat" of the FD); a8, a backup preparation icon for copying all the contents of a floppy disk to a new floppy disk (i.e., starting the "diskcopy" command); a9, an FD initialization icon for initializing a floppy disk (i.e., starting the "format" command); a10, a "computer main body→FD" icon for copying (backup copy) all the contents stored in the computer main body (the hard RAM (H-RAM) set in the main memory 12 or the hard disk 30) to floppy disks (i.e., starting the "allcopy" command for the hard RAM, and the "backup" command for the hard disk); a11, an "FD→computer main body" icon for copying all the contents of floppy disks to the computer main body (i.e., starting the "allcopy" command for the hard RAM, and the "backup" command for the hard disk); and a12, an MS-DOS icon for setting the MS-DOS stored in the DOS ROM 21 in a usable state (i.e., starting "command.com").

Reference symbols b1 through b12 denote icon titles displayed in correspondence with the icons a1 through a12.

Reference symbol C denotes a message line (title bar) for displaying the contents of an icon in a selected state, i.e., emphatically displayed, e.g., inverted-displayed.

Reference symbols d1 through d10 denote function display portions for displaying the functions of function keys F1 through F10 arranged on the keyboard 33. In this case, the function display portion d7 serves as a function display guide for the function key F7, and indicates that a user registration function is selected by operating the function key F7. When the function key F7 is operated in accordance with this function display guide, a command corresponding to the function key operation is executed to execute the respective routines (shown in FIGS. 5 through 9) included in the menu display processing program (P MENU) 21a. With this operation, software copied (installed) in the computer main body can be registered in an icon on the menu through the user registration screens shown in FIGS. 10 through 14.

By selecting the icon emphatically displayed after this registration, the software registered in the icon can be executed.

The function display portion d1 displays the function of the function key F1 for setting date and time data in the CMOS memory of the real time clock 17; the function display portion d2, the function of the function key F2 for designating whether to set a kanji entry mode and to practice entry; the function display portion d3, the function of the function key F3 for setting the computer main body in various modes, e.g., a resume mode, a speaker mode, a low-battery alarm mode, an automatic power-off mode, a screen inverted-display mode, and an automatic hard disk stop mode; the function display mode d4, the function of a function key F4 for selecting a type of printer driver; and the function display portion d5, the function of a function key F5 for performing setting of a memory such as a hard RAM or an EMS.

The function display portion d7 displays the function of the function key F7 for registering user's commands in "USER REGISTRATION 1"/"USER REGISTRATION 2" as menus. When the function key F7 is operated on the menu screen shown in FIG. 4, the routines shown in FIG. 5 through 9, which include setting of a user registration icon and execution of a corresponding command, are executed. Each of the user registration screens shown in FIGS. 10 through 14 is displayed in a predetermined area as a window on the menu screen shown in FIG. 4 at a lower left position (between the menu icons and the function display portions) in accordance with a processing stage. By performing a registration setting operation of software in accordance with the display contents of this window, the software copied to the computer main body can be registered in an icon on the menu. Upon registration, the icon is emphatically displayed.

The function display portion d9 displays the function of the function key F9 for changing "CONFIG.SYS" (environment setting file); and the function display portion d10, the function of the function key F10 for performing effective display only when the hard disk (HDD pack) 30 is mounted, thereby defining partitions of the hard disk and formatting it.

Figure 5:
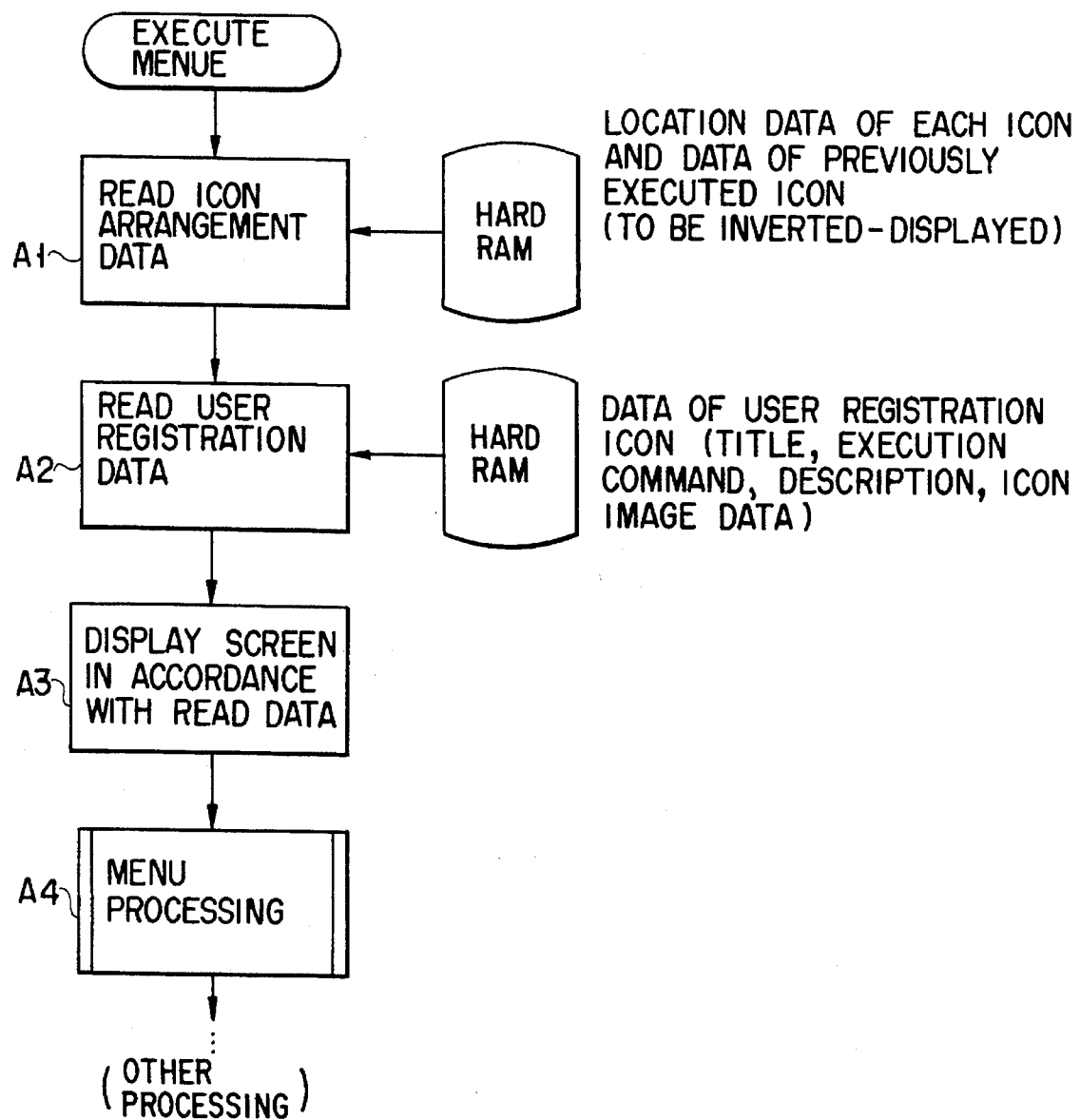
FIG. 5 is a flow chart showing a sequence of starting display of a menu screen in the first embodiment.
Figure 6:
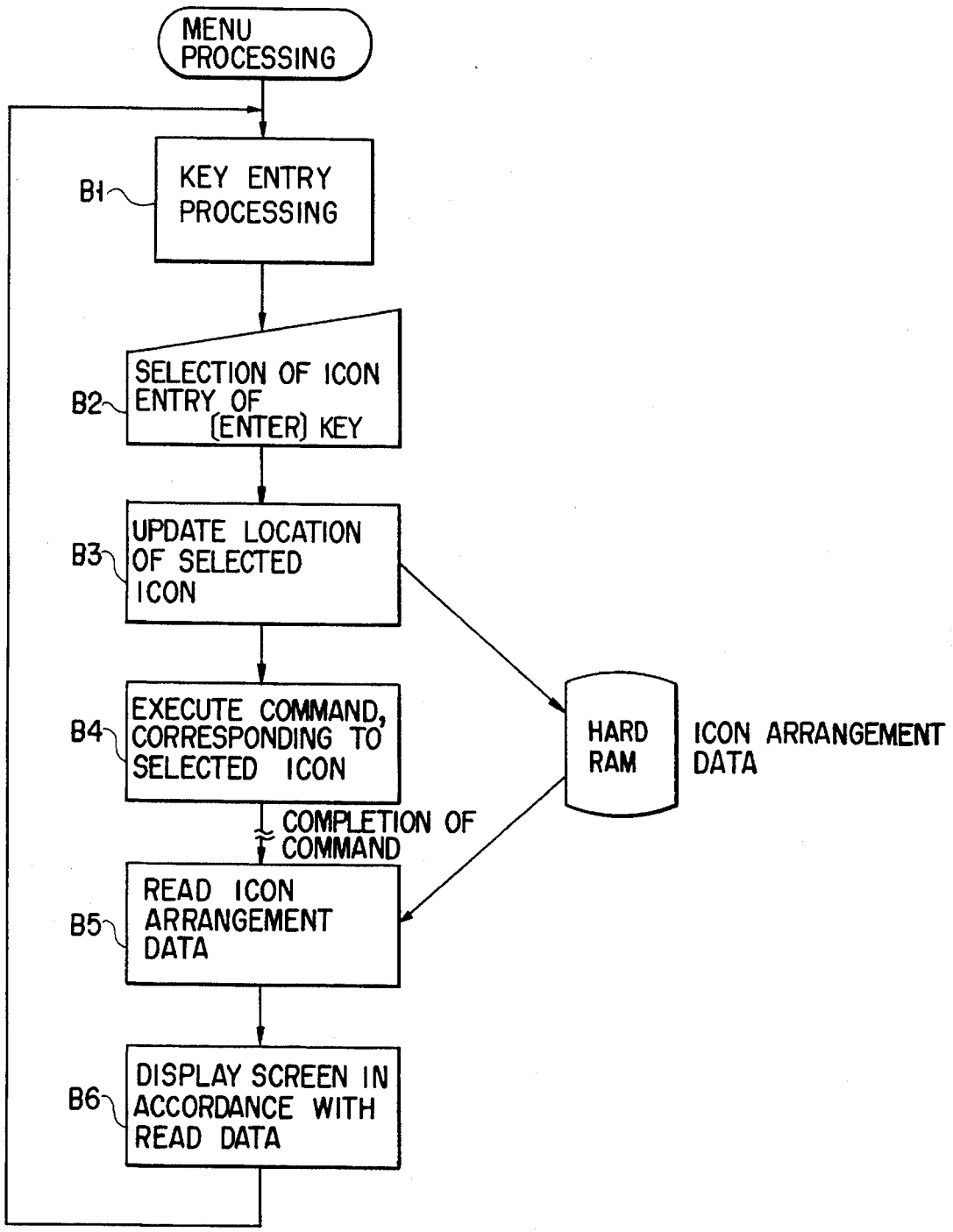
FIG. 6 is a flow chart showing a sequence of performing menu processing in step A4 in FIG. 5.

FIGS. 5 through 9 are flow charts showing menu display processing performed by the menu display processing program (P MENU) 21a stored in the DOS ROM 21. Of these drawings, FIGS. 5 and 6 are flow charts showing a display processing flow for the menu screen shown in FIG. 4. FIG. 5 is a flow chart showing a menu starting sequence. FIG. 6 is a flow chart showing a menu processing sequence in step A4 in FIG. 5.

FIGS. 7 through 9 are flow charts showing user registration processing in which software programs loaded in the computer main body are registered as icons in the user registration icons a4 and a5 on the menu screen shown in FIG. 4. FIG. 7 shows a user registration sequence to be performed when the "USER REGISTRATION" function is selected by the function key F7 on the menu screen shown in FIG. 4. In this user registration sequence, registration is arbitrarily performed by the user instead of performing registration by software install processing upon selection of the software install icon a6. FIGS. 8 and 9 show registration processing in which registration is automatically performed by software install processing upon selection of the software install icon a6.

That is, the user registration icons a4 and a5 are software execution icons for registering arbitrary software programs such as commercially available software in the menu, and starting them. There are two methods of performing software registration in the user registration icons a4 and a5. In the first registration method, the function key F7 is operated on the menu shown in FIG. 4 to access the user registration function in the menu display processing program (P MENU) 21a, and an icon (a4 or a5) in which icon registration is to be performed is selected. The user then sets and registers arbitrary registration data. In the second registration method, the software install icon a6 is selected on the menu screen, and the software install program in the menu display processing program (P MENU) 21a is started. Registration data of the program is then automatically registered in a non-registered icon. FIG. 7 shows a sequence of the first registration method. FIGS. 8 and 9 show a sequence of the second registration method.

FIGS. 10 through 14 show the contents of user registration screens (windows) displayed by the execution of a user registration processing program included in the menu display processing program (P MENU) 21a upon selecting the user registration function by operating the function key F7 on the menu screen shown in FIG. 4 in accordance with the function display portion d7. Each of these screens is displayed in a predetermined area as a window on the menu screen shown in FIG. 4 at a lower left position (between the menu icons and the function display portions) in accordance with a processing stage. By performing a registration setting operation of software in accordance with the display contents of this window, the software copied to the computer main body can be registered in an icon on the menu. Upon registration, the icon is emphatically displayed.

FIG. 15 shows a display screen displaying a menu of software which can be installed. These software are read from software for software installation (a software install disk accompanying the system) in the process of executing the software install program of the menu display processing program (P MENU) 21a, which program is started upon selection of the software install icon a6 on the menu screen shown in FIG. 4.

An operation of an embodiment of the present invention will be described below with reference to the above-described drawings.

when the system power is turned on, the CPU 11 executes an initialization processing routine stored in the system ROM 13. Upon confirming in the processing routine that the MS-DOS is not supplied from the floppy disk drive 31, the hard disk (HDD pack) 30, or the like, the CPU 11 automatically installs the DOS from the DOS ROM 21, incorporated as a standard unit in the computer main body, in the main memory 12. The CPU 11 then executes the menu display processing program (P MENU) 21a, stored in the DOS ROM 21, under the DOS. In practice, the computer is designed to allow two types of boot modes, i.e., the above-described mode, and the boot mode in which the DOS stored in the DOS ROM 21 is preferentially installed to start the system. A description of the latter mode will be omitted.

In this case, as shown in FIG. 2, the DOS ROM 21 is mapped in the common address space together with the kanji ROM 19, the dictionary ROM 20, the application ROM 22, and the expansion application ROM 36, and hence is selectively read-accessed by bank switching.

This inter-ROM bank switching is performed by hardware using the enable signals E1 and E2 set by the CPU 11 and output from the bus controller 11A, and the signals P36 and P37 output from I/O ports of the keyboard controller 27. When the enable signals E1 and E2 are respectively set at "0" and "1", and the I/O port signals P36 and P37 are respectively set at "1" and "0", the enable signal EN for ROM selection is output from the AND gate G5 of the gate circuit 40 to the DOS ROM 21, thereby allowing access control with respect to the DOS ROM 21.

Menu display processing performed by the menu display processing program (P MENU) 21a when the system is started by the DOS in the DOS ROM 21 will be described below with reference to the flow charts in FIGS. 5 through 9. Assume that a hard RAM is set in the main memory 12, and that a file containing menu display management data including menu icon display location data is arranged in the hard RAM.

A starting operation for displaying a menu screen will be described first with reference to the flow chart in FIG. 5.

In a starting operation for displaying a menu screen, data required for the display of the menu screen, i.e., the location data of each icon, the data of a previously executed icon (to be inverted-displayed), icon title data, message line (description) data, and menu constituent data such as the function display portion data of each function key are loaded from the hard RAM set in the main memory 12 into the main memory 12 (step A1 in FIG. 4). After user registration icon data (e.g., title, execution command, description, and icon image data) are loaded (step A2 in FIG. 5), a menu screen such as the one shown in FIG. 4 is displayed in accordance with each data described above (step A3 in FIG. 5).

An icon corresponding to a task to be executed is selected on the menu screen, and menu processing is executed (step A4 in FIG. 5).

Menu processing to be executed in this case will be described below with reference to the flow chart in FIG. 6.

On the menu screen shown in FIG. 4, an icon corresponding to a task to be executed is selected by operating cursor keys and a confirmation key. Assume that the right cursor key is operated to sequentially shift icons inverted-displayed to the right, and the [Enter] key as a confirmation key is operated after a target icon is inverted-displayed (steps B1 and B2 in FIG. 6).

Upon this icon selecting operation, the icon location data in the menu display management data file is updated in accordance with the location data of the selected icon, and the task corresponding to the selected icon is started. That is, when the [Enter] key for confirming icon selection is operated, the icon location data in the file is updated into the location data of the selected icon, and a command corresponding to the selected icon is executed (steps B3 and B4 in FIG. 6).

In the next menu display processing, the icon based on the updated icon location data is inverted-displayed as an initial target icon.

When the execution of the selected command is completed, the menu display processing program (P MENU) 21a is started again to display the menu screen shown in FIG. 4. In this case, the initial target icon is inverted-displayed on the basis of the updated icon location data in the file. That is, the icon corresponding to the command completed just now is inverted-displayed as an initial target icon (steps B5 and B6 in FIG. 6).

Icon registration of software in the user registration icons a4 and a5 will be described next with reference to FIGS. 5 through 9.

There are two registration methods. In the first registration method, the function key F7 is operated on the menu screen shown in FIG. 4 to access the user registration function in the menu display processing program (P MENU) 21a, and an icon (a4 or a5) in which icon registration is to be performed is selected. The user then sets and registers arbitrary registration data. In the second registration method, the software install icon a6 is selected on the menu screen, and the software install program in the menu display processing program (P MENU) 21a is started. Registration data of the program is then automatically registered in a non-registered icon. A sequence based on the first registration method will be described with reference to FIG. 7. A sequence based on the second registration method will be described with reference to FIGS. 8 and 9.

When the function key F7 is operated on the menu screen shown in FIG. 4 (steps S1 and S2 in FIG. 7), the screen shown in FIG. 10 is displayed in the predetermined window area, which screen indicates a choice between the user registration icons a4 and a5 as an icon to be registered, and a choice between "REGISTRATION/CHANGE" and "DELETE" (step S3 in FIG. 7).

When a target icon is selected, and the [Enter] key is operated to designate "REGISTRATION", the title setting screens shown in FIGS. 11 through 14 are sequentially displayed in the same area for each setting operation (steps S4 through S6 in FIG. 7).

When a title is input and confirmed, as shown in FIG. 12, the file name setting screen (shown in FIG. 13) for setting a file name (or a file name and attribute data) for starting the software is displayed in the same area. When a file name (or a file name and attribute data) is input and confirmed, the description entry screen shown in FIG. 14 is displayed on the same area to enter a description to be displayed in the message line (title bar) C.

When each setting is completed and checked, and the [Enter] key is operated to confirm the set contents of user registration, the selected user registration icon (a4 or a5) is emphatically displayed as a registered icon. In addition, the contents of the file containing the menu display management data are updated in accordance with the set data (steps S7 through S9 in FIG. 7).

Assume that the [Del] key for designating "DELETE" is operated on the screen (shown in FIG. 10) for selecting a target icon. In this case, the data registered in the selected user registration icon (a4 or a5) is deleted from the file, and the user registration icon (a4 or a5) is restored to a display state indicating a unused state (non-emphasized display) (steps S11 and S12 in FIG. 7).

If each of the above-described settings is completed and checked, and the [Enter] key is operated, all the entered data are deleted (canceled), the current screen is restored to the menu screen shown in FIG. 4 (step S10 in FIG. 7).

The second registration method will be described next with reference to FIGS. 8 and 9. In this method, the software install icon a6 is selected on the menu screen, and the software install program of the menu display processing program (P MENU) 21a is started to automatically register the registration data of the program in a non-registered icon.

When the software install icon a6 is selected on the menu screen, and the [Enter] key is operated, the processing shown in FIG. 9 is started (steps S21 through S23 in FIG. 8).

Upon completion of this processing, the updated contents of the file are reflected in the menu screen shown in FIG. 4, and the software selected by the processing shown in FIG. 9 is automatically registered, as an icon, in a non-registered icon (steps S24 and S25 in FIG. 8).

In the software install registration processing shown in FIG. 9, a menu of software which can be installed is displayed according to the format shown in FIG. 15. These software are loaded from the software for software installation (the software install disk accompanying the system). One piece of software to be selected is selected on this screen, and the [Enter] key is operated (steps S31 and S32 in FIG. 9). As a result, the presence/absence of a non-registered icon is checked (step S33 in FIG. 9). If the presence of a non-registered icon is confirmed, data associated with the selected software, e.g., an icon title, an execution command, the description of the command, and the file name of an icon file, are registered in the file. This data is then reflected in the non-registered icon so that the non-registered icon is changed into a registered icon in accordance with the above-mentioned icon data (step S34 in FIG. 9).

In this case, if icon image data included in the icon data, an icon pattern based on the image data is displayed.

If arbitrary software is registered in a user registration icon in this manner, the software can be easily executed afterward by only selecting the user registration icon emphatically displayed on the menu screen.

Figure 16:
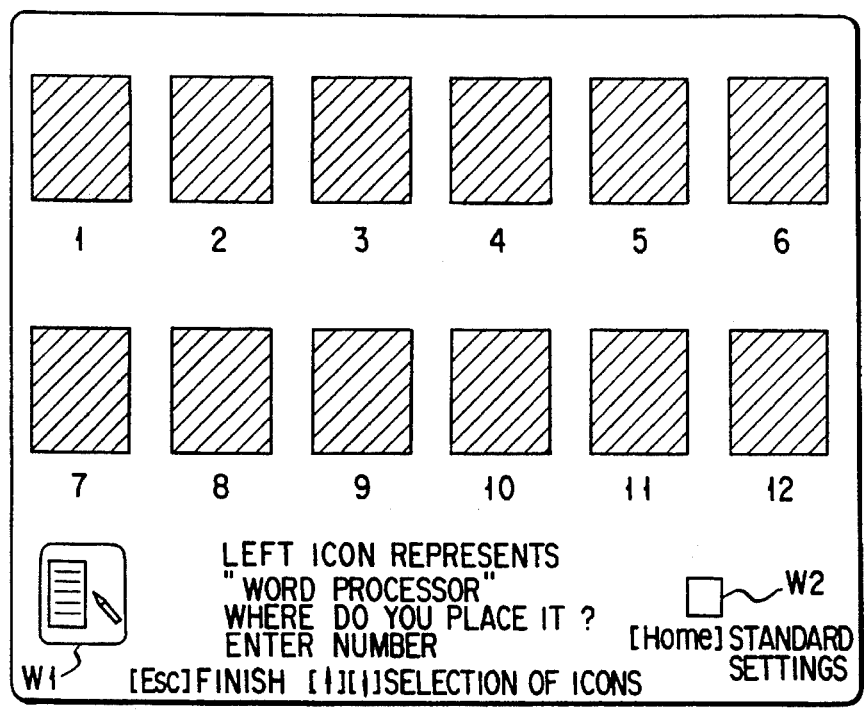
FIG. 16 is a view showing the arrangement of a menu screen displayed when a "MENU REARRANGEMENT" function is selected on the initial menu screen shown in FIG. 14.

FIG. 16 shows a menu screen displayed when the "MENU REARRANGEMENT" function is selected on the initial menu screen shown in FIG. 4.

Figure 18:
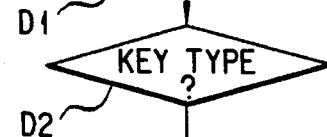
FIG. 18 is a flow chart showing a sequence of a setting process in step C4 in FIG. 17.
Figure 18:
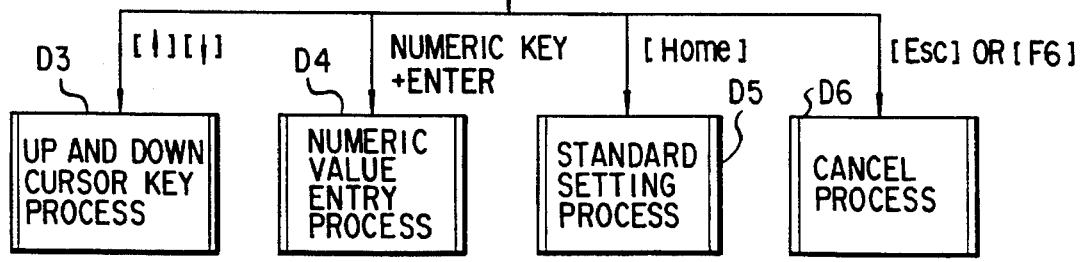
Figure 17:
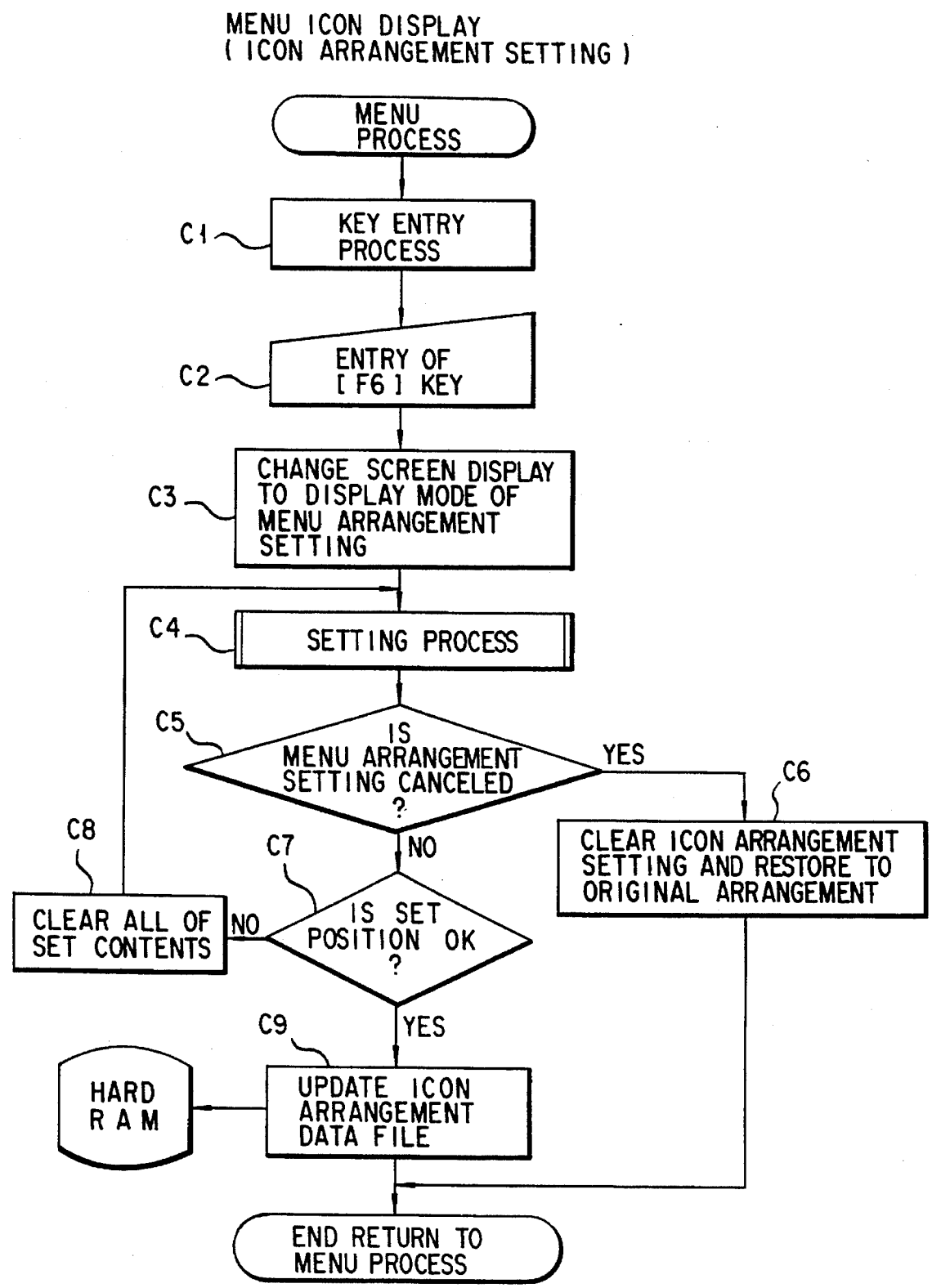
FIG. 17 is a flow chart showing a sequence of an icon rearrangement setting process to be performed when a "MENU REARRANGEMENT" function is selected on the initial menu screen shown in FIG. 14.
Figure 19:
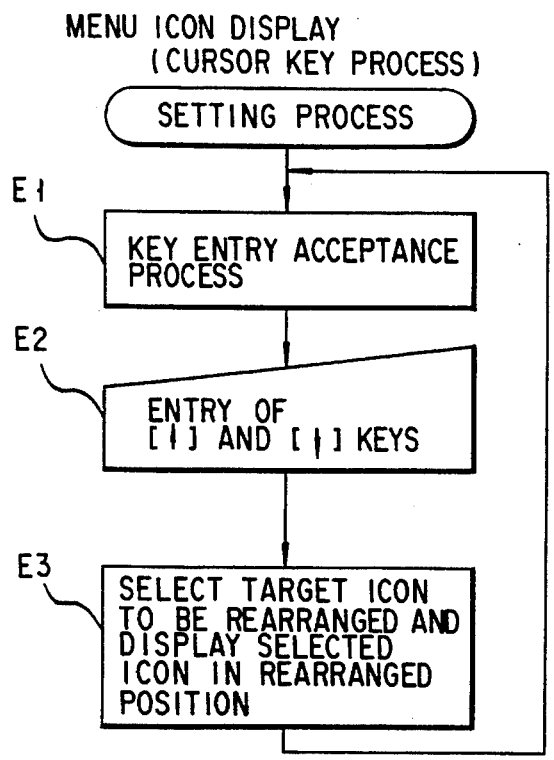
FIG. 19 is a flow chart showing a sequence of up and down cursor key process in step D3 in FIG. 18.
Figure 21:
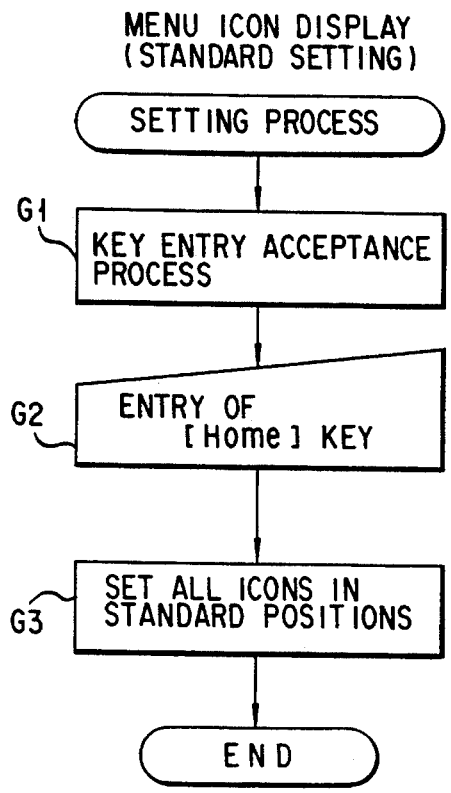
FIG. 21 is a flow chart showing a sequence of a standard setting process in step D5 in FIG. 18.
Figure 20:
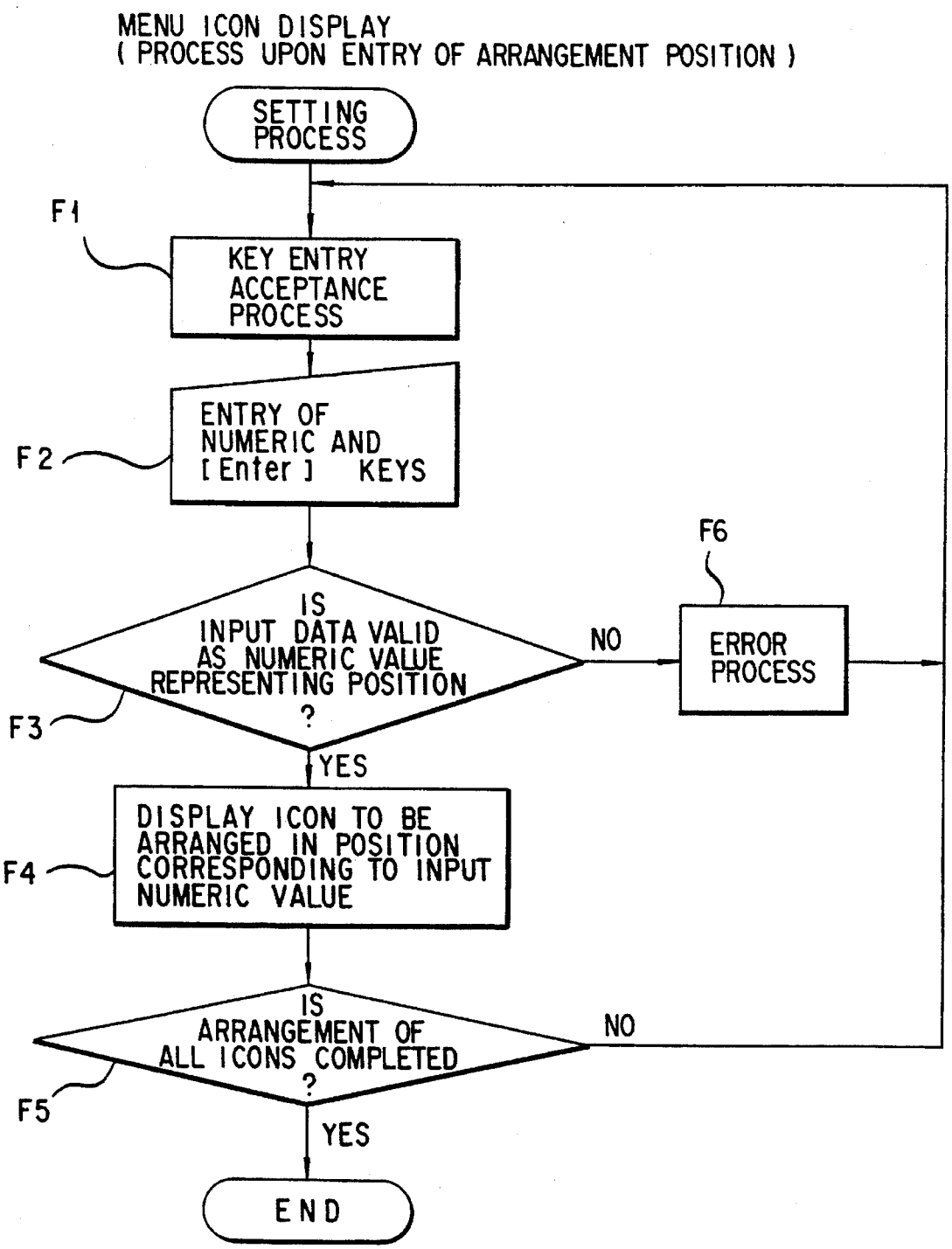
FIG. 20 is a flow chart showing a sequence of a numeric entry process in step D4 in FIG. 18.

FIGS. 17 through 22 respectively show routines for a menu icon rearrangement process and a restoration process to standard settings on the menu screen shown in FIG. 16 when the "MENU REARRANGEMENT" function is selected on the initial menu screen shown in FIG. 4 upon operation of the function key F6. FIG. 17 is a flow chart showing a sequence of icon arrangement setting upon selection of the "MENU REARRANGEMENT" function on the initial menu screen shown in FIG. 14. FIG. 18 is a flow chart showing a sequence of a setting process in step C4 in FIG. 17. FIG. 19 is a flow chart showing a sequence of an up and down cursor key process in step D3 in FIG. 18. FIG. 20 is a flow chart showing a sequence of a numeric value entry process in step D4 in FIG. 18. FIG. 21 is a flow chart showing a sequence of a cancel process in step D6 in FIG. 18.

In the menu icon display processing shown in FIGS. 17 through 22, the menu icon arrangement setting screen (see FIG. 16) is displayed upon operation of the function key F6 on the menu screen, and an icon arrangement position is entered as a number to arrange and display an icon at the designated position. In this case, an icon to be arranged can be changed by a key operation of the up and down cursor keys and the like. An icon to be arranged is displayed on a window on the screen (see FIGS. 17 through 22 and FIG. 16). If a key for standard settings (e.g., the [Home] key) is operated on the menu icon arrangement setting screen, icons can be automatically set at the standard positions of the system (see FIGS. 17 and 21).

A menu icon rearrangement process and a restoration process to standard settings will be described below with reference to FIGS. 17 through 22.

In this case, the menu screen shown in FIG. 16 is displayed when the function key F6 is operated on the menu screen in FIG. 4 in accordance with the display guide of the function display portion d6 displaying "MENU REARRANGEMENT", and a menu icon rearrangement process and a restoration process to standard settings can be performed on the menu screen.

When the icon arrangement on the menu screen is to be changed, the "MENU REARRANGEMENT" function is selected by a key operation. In this case, the function key F6 is operated on the menu screen in FIG. 4 in accordance with the display guide of the function display portion d6 displaying "MENU REARRANGEMENT" (steps C1 and C2 in FIG. 17).

Upon execution of a command corresponding to the operation of the function key F6, a menu rearrangement screen for changing the icon arrangement, such as the one shown in FIG. 16, is displayed instead of the menu screen shown in FIG. 14 (step C3 in FIG. 17). This screen has an icon display window w1 and an arrangement number entry portion w2.

On this menu rearrangement screen, the icon rearrangement process, the restoration process to standard settings, the cancel process, and the like shown in FIGS. 18 through 22 are executed (step C4 in FIG. 17).

The respective processes will be described later with reference to FIGS. 18 through 22.

In the above-mentioned menu rearrangement process, when the [Esc] key or the [F6] key is operated to designate a cancel process (forced termination), the icon arrangement set on the currently displayed menu rearrangement screen is completely canceled to finish the menu rearrangement process, and the current screen is restored to the initial menu screen shown in FIG. 4 (steps C5 and C6 in FIG. 17).

When all the icons are arranged on the menu rearrangement screen, a message for confirmation of set positions (e.g., "IS THIS ARRANGEMENT") and choices ("YES" and "NO") are displayed on part of the screen, thereby instructing the user to confirm the completion of the icon rearrangement process (step C7 in FIG. 17).

Assume that the user checks the position of each icon set on the menu rearrangement screen, and wants to change a given set position. In this case, the abovementioned choice ("NO") is selected to clear the rearrangement screen shown in FIG. 16, and rearrangement setting is performed again with respect to the target icon by using the icon display window w1 and the arrangement number entry portion w2 (step C8 in FIG. 17).

Assume that the user checks the position of each icon set on the menu rearrangement screen, and decides that there is no set position to be changed. In this case, the abovementioned choice ("YES") is selected to confirm the icon rearrangement setting. With this operation, the menu icon position data in the menu display management data file stored in the hard RAM in the main memory 12 is updated in accordance with the changed icon arrangement. Finally, the menu rearrangement process is ended, and the current screen is restored to the initial menu screen shown in FIG. 14 (step C9 in FIG. 17).

The icon setting process shown in FIG. 18 will be described next with reference to FIGS. 18 through 22.

In the icon setting process, the up and down cursor keys, the numeric keys, the [Enter] key, the [Home] key, the [Esc] key, the function key F6, and the like arranged on the keyboard 33 are operated to perform the following processes: scrolling a target icon to be displayed on the icon display window w1 (replacing a target icon); rearrangement position setting of an icon displayed on the icon display window w1 upon entry of a numeric value into the arrangement number entry portion w2; a standard setting process; a cancel process; and the like (steps D1, D2, . . . , D6 in FIG. 18).

Figure 22:
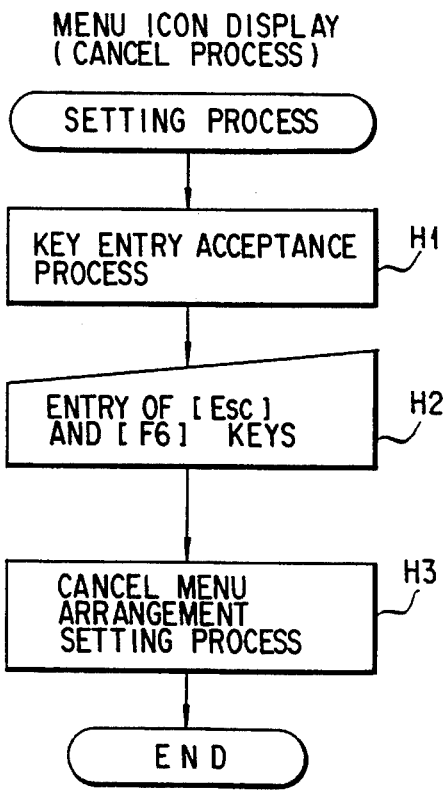
FIG. 22 a flow chart showing a sequence of a cancel process in step D6 in FIG. 18.

FIG. 19 shows the process of replacing an icon on the icon display window w1 by operating the up and down cursor keys. FIG. 20 shows the process of setting the arrangement position of an icon by operating the numeric keys and the [Enter] key to enter a numeric value into the arrangement number entry portion w2. FIG. 21 shows the standard setting process upon operation of the [Home] key. FIG. 22 shows the cancel (forced termination) process upon operation of the [Esc] key or the function key F6.

In the process of replacing an icon on the icon display window w1 upon operation of the up and down cursor keys, a target icon displayed on the icon display window w1 is replaced upon a scroll up/scroll down operation performed by operating the up and down cursor keys (steps E1, E2, and E3 in FIG. 19).

As shown in FIG. 19, in the process of setting the arrangement position of an icon displayed on the icon display window w1, the arrangement position of the icon displayed on the icon display window w1 is entered as a numerical value (1 through 12) by operating a numeric key or keys, thus setting the icon displayed on the icon display window w1 to the icon arrangement position designated by the numeric input (1 through 12). When setting of all icons is completed, the message for the confirmation of the arrangement and the choices ("YES" and "NO") are displayed on part of the rearrangement screen shown in FIG. 16, thus instructing the user to confirm the completion of the icon rearrangement process (steps F1, F2, . . . , F6 in FIG. 20).

When the icon arrangement set by the processes shown in FIGS. 19 and 20 is to be restored to the standard arrangement set beforehand on the computer main body side, the [Home] key is operated. Subsequently, the menu screen having the icon arrangement set on the basis of the standard menu icon arrangement position data in the menu display management data file stored in the hard RAM in the main memory 12 is displayed by the process performed in accordance with a command input upon the key operation (steps G1, G2, and G3 in FIG. 21).

To cancel the icon arrangement set by the processes shown in FIGS. 19 and 20, the [Esc] key or the function key F6 is operated. Subsequently, the icon arrangement set on the current rearrangement screen is canceled by the process performed in accordance with a command input upon the key operation, and the current screen is restored to the menu screen shown in FIG. 4 (steps H1, H2, and H3 in FIG. 22).

Figure 23:
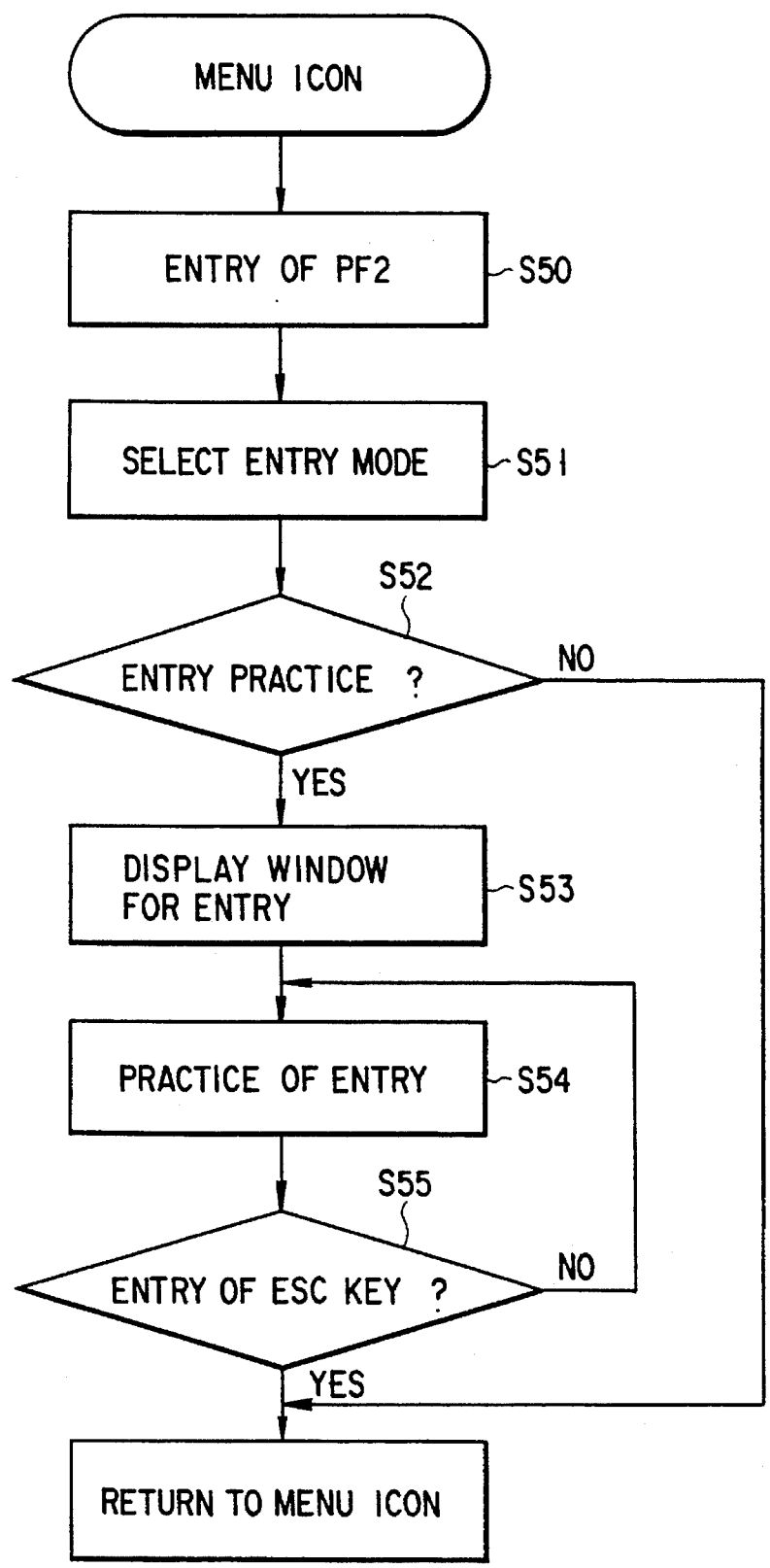
FIG. 23 is a flow chart showing a sequence of an entry mode process.

A keyboard entry practice mode set from the menu screen upon operation of a function key will be described next with reference to FIGS. 23, 25, and 26.

When the operator operates a key PF2 while the menu screen shown in FIG. 4 is displayed (step S50), the entry mode setting screen shown in FIG. 25 is displayed. When this screen is displayed, the operator selects either "ROMAN" or "KANA" (step S51). As a result, environment setting of the entry mode is executed. The environment-set entry mode is also reflected in the application program stored in the application ROM 22. The operator then selects "YES" or "NO" with respect to keyboard entry practice (step S52). If the operator selects "NO" with respect to keyboard entry practice, the processing is ended, and the current screen is restored to the menu screen shown in FIG. 4. In contrast to this, if the operator selects "YES" with respect to keyboard entry practice, the keyboard entry practice window shown in FIG. 26 is displayed in step S53. The operator can perform a keyboard entry practice within this window (step S54). If the operator wants to finish the keyboard entry practice, he/she depresses the [Esc] key (step S55). When the [Esc] key is depressed, the current screen can be restored to the menu screen shown in FIG. 4.

By depressing the key PF2 in this manner with the menu screen being displayed, environment setting of an entry mode and the keyboard entry practice can be performed. An unskilled user of a personal computer becomes accustomed to the computer through this keyboard entry practice.

Processing to be performed when an application program selected by an icon selecting operation is not stored in the H-RAM 12 will be described next with reference to FIGS. 24 and 27.

Assume that an application program corresponding to an accessory D4 is selected on the menu screen shown in FIG. 4. In this case, it is checked first whether the application program is stored in the H-RAM 12 (step S60). If the application program is stored in the H-RAM 12, the application program is started (step S61), and the execution of the application software is started (step S64). If the application program is not stored in H-RAM 12, guidance to instruct the operator to insert the FDD 31 in which the application program is stored is displayed, as shown in FIG. 27 (step S62). When the operator inserts the FDD 31, in which the application program is stored, in accordance with the instruction of the guidance, the application program is started (step S63), and the execution of the application software is started (step S64).

As described above, even if an application program to be accessed upon operation of the icon D6 for software installation is not stored in the H-RAM 12, the guidance to instruct the operator to insert the FDD 31 in which the application program is stored is displayed to allow even an unskilled operator to easily operate the personal computer.

The above-described embodiment exemplifies only the portable computer constituted by the system components shown in FIG. 1. However, the menu display mechanism of the present invention can also be realized by other system configurations, logic address configurations, and the like. In addition, in the above embodiment, the menu display processing program (P MENU) 21a is set in the DOS ROM 21, and the menu display management data film is set in the hard RAM in the main memory 12. However, the present invention is not limited to this. For example, the menu display processing program (P MENU) 21a may be stored in another ROM, and the menu display management data file may be stored in the hard disk (HDD pack) 30. Furthermore, the hardware arrangement for inter-ROM band switching is not limited to the one in the embodiment described above. Other hardware arrangements and logic arrangements may be employed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable computer for executing tasks, each identified by a file name, the portable computer comprising:

display means for displaying a menu screen having a plurality of task-registered icons for task selection at least one user-registration icon for selecting execution of a new task to be registered by a user;

means for selecting the user-registration icon from the menu screen and for setting a file name for the new task corresponding to the user-registration icon;

means for darkening the display of the user-registration icon to indicate that the new task has been registered;

means for storing display data for the menu screen including display data for the darkened user-resistration icon; and means for, when the user-registration icon is selected on the menu screen, initiating execution of the new task.

2. A computer according to claim 1, further comprising:

means for providing a plurality of user-registration icons for selecting execution of software registered by the user, and for selecting at least one of the user-registration icons in a predetermined order to be set in a registered state; and means for designating the user-registration icon and canceling the registration thereof.

3. A computer according to claim 1, further comprising means for displaying an operation guide for registration of a user-registration icon and cancellation thereof on the menu screen on which the user-registration icon is displayed.

4. A computer according to claim 2, wherein the software registered by the user includes icon display data, and said computer further includes means for, when the software is selected through the user-registration icon, displaying the user-registration icon based on the icon display data of the software at a display position of the user-registration icon.

5. A portable computer having a function of displaying a menu screen including a plurality of task-registered icons for task selection and execution of software corresponding to each task-registered icon, comprising:

at least one user-registration icon displayed on the menu screen for selecting execution of software to be registered by a user;

a software-install icon, arranged on the menu screen among the task-registered icons, for selecting a task for executing an installation software;

means for displaying a list of a plurality of software available in a memory of the portable computer which can be installed upon selection of the software-install icon;

means for selecting one of the plurality of software from the list;

means for reflecting data unique to the selected software in the user-registration icon on the menu indicate that the selected software has been registered and corresponds to the user-registration icon;

means for storing display data of the darkened user-registration icon as part of display data of the menu screen; and means for, when the user-registration icon is selected on the menu screen, executing the selected software having a file name corresponding to the user-registration icon.

6. A computer according to claim 5, further comprising:

means for providing a plurality of user-registration icons for selecting execution of software registered by the user, and for selecting at least one of the user-registration icons in a predetermined order to be set in a registered state; and means for designating the user-registration icon and canceling the registration thereof.

7. A computer according to claim 3, further comprising means for displaying an operation guide for registration of a user-registration icon and cancellation thereof on the menu screen on which the user-registration is displayed.

8. A computer according to claim 5, wherein the software registered by the user includes icon display data, and said computer further includes means for, when the software is selected through the user-registration icon, displaying the user-registration icon based on the icon display data of the software at a display position of the user-registration icon.

9. A portable computer having a function of displaying a menu screen including a plurality of task-registered icons for task selection, comprising:

at least one user-registration icon, arranged on the menu screen, for selecting execution of software registered by a user;

means for setting a file name and attribute data of an icon title, an execution command, and the description of the command with respect to the user-registration icon;

means for displaying the user-registration icon on the menu screen after the file name and the attribute data are set, upon changing a display form of the user-registration icon to a display form indicating that the user-registration icon has already been registered, and for displaying the set attribute data in an area corresponding to the user-registration icon;

means for storing the file name and the attribute data of the user-registration icon as part of display data of the menu screen; and means for, when the user-registration icon in the display form indicating that the user-registration icon has already been registered is selected on the menu screen, starting software having a file name corresponding to the user-registration icon.

10. A computer according to claim 9, further comprising:

means for providing a plurality of user-registration icons for selecting execution of software registered by the user, and for selecting at least one of the user-registration icons in a predetermined order to be set in a registered state; and means for designating the user-registration icon and canceling the registration thereof.

11. A computer according to claim 4, further comprising means for displaying an operation guide for registration of a user-registration icon and cancellation thereof on the menu screen on which the user-registration icon is displayed.

12. A computer according to claim 4, wherein the software registered by the user includes icon display data, and said computer further includes means for, when the software is selected through the user-registration icon, displaying the user-registration icon based on the icon display data of the software at a display position of the user-registration icon.

13. A portable computer comprising:

an icon display window opened on a menu screen when a menu icon arrangement setting mode is selected;

target icon display means for displaying target icons to be rearranged on the icon display window one by one;

first operation entry means for updating display contents of the icon display window;

second operation entry means for selecting an icon display position; and icon setting means for arranging an icon, selected by said first operation entry means and displayed on the icon display window, at an icon display position selected by said second operation entry means.

14. A portable computer according to claim 13 further comprising:

storage means for storing default icon display position data;

third operation entry means for designating restoration to a standard icon set state; and means for canceling icon display position data set in an icon arrangement setting mode in accordance with an instruction from said third operation entry means, and displaying icons in accordance with the icon display position data set as standard data in accordance with the stored data.

15. A method of selecting a function with an illustration as an icon, comprising the computer steps of:

a) displaying a first menu screen having, as menu components, a plurality of icons for selecting tasks to be executed, and a plurality of function selector display guides including an icon arrangement function selector when system power is turned on;

b) displaying a second menu screen for opening an icon display window for deleting each icon on the first menu screen and displaying target icons to be rearranged one by one and an arrangement number entry window for designating an arrangement position of an icon displayed on the icon display window, and for allowing updating of display contents of the icon display window, and setting of an arrangement number in the arrangement number entry window when the menu icon rearrangement function selector is selected while the first menu screen is displayed; and c) displaying a third menu screen for arranging an icon displayed on the icon display window at an icon display position corresponding to the set arrangement number, and displaying a changed registered state of the icon when an arrangement number is set in the arrangement number entry window on the second menu screen, wherein a menu screen having icons rearranged by the second and third menu screens becomes a first menu screen when the system power is turned on next.

16. A portable computer comprising:

means for simultaneously displaying a task selection icon screen including a user-registration icon for selecting at least one application program, and a plurality of function key definition guidance data arranged in correspondence with a plurality of function keys to define operations of the function keys, one of said function keys to define operations of the function keys, one of said function keys functioning to set a system environment for a data entry mode, and the function of setting a system environment for the data entry mode including a function of setting and displaying an entry practice window on the menu screen in which an operator performs a keyboard entry practice;

means for selecting one of the task-selection and user-registration icons on the menu screen; and means for selecting the function key definition guidance data on the menu screen by using a corresponding one of said function keys.

17. A portable computer having a predetermined area on a display screen in which icons are displayed, comprising:

means for displaying the icons in a plurality of predetermined display areas on the display screen in one-to-one correspondence;

entry means for instructing rearrangement of the icons;

means for displaying target icons to be rearranged on a display window one by one in response to the instruction of icon rearrangement;

entry means for designating a specific area of the plurality of display areas on the display screen in which an icon displayed in the display window is rearranged; and means for displaying an icon, displayed in the display window, in a display area designated by data entered by said designating means.

18. A computer according to claim 17, wherein the plurality of icons are sequentially selected by using cursor keys.

19. A portable computer having a predetermined area on a display screen in which icons are displayed, comprising:

a keyboard having a plurality of function keys; means for displaying icons in a plurality of predetermined display areas on the display screen in one-to-one correspondence, and simultaneously displaying a plurality of function key definition guidance data arranged in correspondence with the plurality of function keys to define operations thereof, said function keys including a function key for selecting a system configuration file;

means for selecting the icons; and means for selecting the function key definition guidance data by using corresponding function keys.

20. A portable computer having a predetermined area on a display screen in which icons are displayed, comprising:

keyboard means having a plurality of function keys;

means for respectively displaying icons in a plurality of predetermined display areas on the display screen, and simultaneously displaying a plurality of function key definition guidance data arranged in correspondence with the plurality of function keys to define operations of the function keys, said function keys including a function key having a function of setting a system environment for a data entry mode, and displaying an entry practice window on a menu screen in which an operator performs a keyboard entry practice;

means for selecting the icons; and means for selecting the function key definition guidance data by using corresponding function keys.

21. A portable computer having a predetermined area on a display screen in which icons are displayed, comprising:

means for storing software;

means for displaying a plurality of areas on the display screen in which new icons can be displayed, the plurality of display areas being constituted by rectangular display frames of uniform size;

means for selecting one of the plurality of icon display areas;

means for registering the software in the selected icon display area;

means for canceling registration of the registered software; and means for changing, from a dark display to a light display, a display of the display frame of a display area in which an icon corresponding to deleted software has been displayed.

* * * * *